US010561068B2

(12) United States Patent
Peden

(10) Patent No.: US 10,561,068 B2
(45) Date of Patent: *Feb. 18, 2020

(54) HAY BALER WITH WINDROW PICKUP DIVERTER AND EXTENDIBLE WHEEL RAKE MOUNTING ON ELONGATED DRAWBAR

(71) Applicant: Bruce W. Peden, Glasgow, KY (US)

(72) Inventor: Bruce W. Peden, Glasgow, KY (US)

(*) Notice: Subject to any disclaimer, the term of this patent is extended or adjusted under 35 U.S.C. 154(b) by 150 days.

This patent is subject to a terminal disclaimer.

(21) Appl. No.: 13/987,136

(22) Filed: Jul. 2, 2013

(65) Prior Publication Data

US 2014/0090347 A1 Apr. 3, 2014

Related U.S. Application Data

(63) Continuation-in-part of application No. 12/590,093, filed on Nov. 2, 2009, now Pat. No. 8,474,232.

(60) Provisional application No. 61/197,984, filed on Oct. 31, 2008.

(51) Int. Cl.
*A01D 89/00* (2006.01)
*A01F 15/10* (2006.01)
*A01D 57/12* (2006.01)
*A01D 78/00* (2006.01)

(52) U.S. Cl.
CPC ........... *A01D 89/007* (2013.01); *A01D 57/12* (2013.01); *A01D 78/001* (2013.01); *A01F 15/10* (2013.01)

(58) Field of Classification Search
CPC combination set(s) only.
See application file for complete search history.

(56) References Cited

U.S. PATENT DOCUMENTS

| 1,877,770 | A | | 9/1932 | Larson |
| 2,731,782 | A | | 1/1956 | Mason |
| 2,756,557 | A | | 7/1956 | Bornzin et al. |
| 2,783,606 | A | | 3/1957 | Wilson |
| 3,010,526 | A | * | 11/1961 | Van Der Lely et al. ..... 172/543 |
| 3,125,845 | A | | 3/1964 | Lee |
| 3,678,669 | A | | 7/1972 | Czajkowski |
| 4,077,189 | A | | 3/1978 | Hering |
| 4,182,103 | A | | 1/1980 | McNutt |
| 4,214,428 | A | | 7/1980 | Caraway |
| 4,446,685 | A | | 5/1984 | Coeffic |
| 4,753,063 | A | * | 6/1988 | Buck ............................... 56/377 |
| 5,127,217 | A | | 7/1992 | Fell et al. |
| 5,400,578 | A | | 3/1995 | Galanti |
| 5,404,702 | A | | 4/1995 | Lewis |
| 5,598,691 | A | | 2/1997 | Peeters |
| 5,899,055 | A | * | 5/1999 | Rowse et al. ................... 56/377 |
| 5,987,864 | A | | 11/1999 | Lutz |
| 6,105,354 | A | | 8/2000 | Luhn et al. |
| 6,109,012 | A | * | 8/2000 | Staal et al. ...................... 56/367 |
| 6,543,212 | B2 | | 4/2003 | Tonutti |
| 7,043,892 | B1 | | 5/2006 | Kessler |

(Continued)

FOREIGN PATENT DOCUMENTS

DE 3429980 A1 * 2/1986
JP 05227824 A * 9/1993

*Primary Examiner* — Alicia Torres
(74) *Attorney, Agent, or Firm* — Carrithers Law Office, PLLC; David W. Carrithers

(57) ABSTRACT

Windrow diverting apparatus and method of controlling same proximate a roll baler pick-up which laterally shifts the windrow relative to the roll bale pick-up during baling.

24 Claims, 44 Drawing Sheets

(56) References Cited

U.S. PATENT DOCUMENTS

| | | | |
|---|---|---|---|
| 8,474,232 B2* | 7/2013 | Peden | A01D 57/12 |
| | | | 56/341 |
| 2002/0059790 A1 | 5/2002 | Paulsen | |
| 2005/0172602 A1 | 8/2005 | Scott | |
| 2006/0150605 A1* | 7/2006 | Wubbels | A01D 75/00 |
| | | | 56/15.8 |

* cited by examiner

HAY BALER WITH WINDROW PICKUP DIVERTER AND EXTENDIBLE WHEEL RAKE MOUNTING ON ELONGATED DRAWBAR

REFERENCE TO RELATED APPLICATIONS

This application claims priority from U.S. application Ser. No. 12/590,093 filed on Nov. 2, 2009 and claims priority from U.S. Provisional application Ser. No. 61,197,984 filed on Oct. 31, 2008 both of which are incorporated by reference herein in their entirety.

FIELD OF INVENTION

This invention relates generally to baling material such as hay or the like where the cut material is raked into a windrow that is picked and baled by a baler and more particularly a circular basket like raking reel, to a windrow diverter apparatus incorporating such reel, a rake with a windrow diverter, to baling apparatus including a baler with a rake and a windrow diverter associated therewith for selectively diverting portions of the windrow laterally, relative to the direction of travel of the baler, during baling and to a rake having an articulated sweep arm providing a wide sweep rake.

Raking and baling functions are performed in a single pass in which the cut material, for example hay, is raked into a windrow that is controllably reduced in width suitable for being picked up and formed into a bale by the baler as a tractor towing the same travels over a mowed field of the hay. The windrow diverting mechanism can divert at least one or the other or both of the marginal edge portions of the windrow reducing it to a width that is no greater than that of the baler pick-up. The width of the windrow can be controllably narrowed by the operator so as to be narrower than the baler pickup and divert that narrower windrow to positions across the width of the bale where and when needed to form a suitable bale.

BACKGROUND OF INVENTION

Attempts at introducing economies into baling material such as hay or the like has resulted in various proposals for combining the raking function and baling function into a single operation. In some instances the rake is mounted on the tractor that tows the baler and by way of example of the same reference maybe had to U.S. Pat. No. 4,214,428 Granted Jul. 29, 1980 Inventor Robert O Caraway entitled "Raking and Baling Machine"; and U.S. Pat. No. 4,077,189 Granted Mar. 7, 1978 Inventor Walton C. Hering entitled "Front Mounted Adjustable Twin Rakes", In other instances the rake is located between the tractor and the baler and by of example of the same reference U.S. Pat. No. 6,105,354 Granted Aug. 22, 2000 Inventor Harold R Luhn et al entitled "Rake apparatus" and U.S. Pat. No. 5,404,702 Granted Apr. 11, 1995 Inventor Johnny M Lewis entitled "Retrofitable Wide Windrow Apparatus".

In these references an elongate draw bar connects the tractor to the baler and a rake is mounted on the draw bar.

Where the raking and baling are two separate operations the operator, during the baling operation, is able to drive along a zig-zag path to distribute the windrow to where needed across the width of the bale to provide, or caused to be formed, a suitable bale. In this operation the windrow is normally narrower in width than the width of the baler pick-up. Driving a zig-zag path virtually little or no affect in a single raking and baling operation in which the windrow discharges from the rake at a position in proximity to the baler intake.

It is known to have side delivery rake means at the infeed end of a pick-up and operative to sweep cut material beyond the width of the pick-up into a path in alignment with the pick-up and by way of example of same reference maybe had to the following United States Patents and publications:

U.S. Pat. No. 5,400,578 Granted Mar. 28, 1995 Inventor Marcello B. Galanti entitled "Apparatus for Raking and Baling Cut Material"; U.S. Pat. No. 5,127,217 Granted Jul. 7, 1992 Inventor Ferol S Fell et al entitled "Round Baler Having Wide Windrow Converging Mechanism"; U.S. Pat. No. 3,125,845 Granted Mar. 24, 1964 Inventor M. A. Lee entitled "Swath Gathering Mechanism"; U.S. Pat. No. 2,783,606 Granted Mar. 5, 1957 Inventor E. I. Wilson entitled "Windrow Divider and Bale Pickup Extension"; U.S. Pat. No. 2,756,557 Granted Jul. 31, 1956 Inventor J. H. Bornzin et al entitled "Pick-up Device with Driven Sweeping Rakes"; and PCT International Application publication No WO 94/10828 Published May 25, 1994 entitled "An Improved Round Baler" Inventor Brian Taeg.

These references disclose converging rake mechanisms that extend laterally beyond the pick-up of the baler and move the material within the swept area into a windrow corresponding to the width of the baler pickup. The rake mechanisms are allowed to move up and down to overcome obstacles and the like but not laterally relative to the path of travel except for U.S. Pat. No. 2,756,557 and the PCT publication. In the '557 patent the lateral movement changes only the width of sweep. The PCT published application discloses a rake having raking reels that are power driven and mounted on arms attached to a draw bar by a telescopic connection capable of being moved in a direction toward and away from the path of travel. The PCT disclosed apparatus is simply a raking and baling operation.

None of the forgoing references disclose means to rake material into a windrow followed by apparatus to shift at least one marginal edge portion of such windrow to reduce the width of the windrow. The forging references fail to disclose or even remotely suggest apparatus for reducing the width of the windrow during baling to be less than that of the baler pick-up and divert that narrower windrow to various positions as maybe desired in a direction laterally across the width of the bale being formed.

Rakes with tined raking wheels in rolling engagement with the ground are known and by way of example reference maybe had to the aforementioned U.S. Pat. No. 4,214,428. The tined wheels perform a raking function by being rotated through frictional engagement with the ground. The tined wheels rotate in vertical planes appropriately angled relative to the direction of travel such that the plurality of tine wheels in series move the material into a windrow.

The aforementioned U.S. Pat. No. 5,400,578 discloses rake members that are power driven and rotate in horizontal planes. The aforementioned PCT published application discloses tined wheels that are power driven and is silent on the orientation of the same.

SUMMARY OF INVENTION

Improvements in a crop baling operation in which cut crop material lying on the ground is raked into a windrow picked up and formed into a bale by a baler in a single pass, the improvement comprising incorporating windrow diverting apparatus proximate the baler pickup controllably laterally shifting marginal edge portions of the windrow relative to the path of travel during baling, the apparatus including first and second side delivery raking means located respectively on opposites sides of the elongated drawbar, means movably mounting the extendible and collapsible raking means for movement relative to the baler in directions toward and away from the path of travel and means for selectively controlling movement of the raking means.

The hay baler apparatus comprises, consists of or consist essentially of a hay baler having an in-feed pickup comprising a rigid member base member fixedly securable with respect to the baler and located forward of the same, a rake comprising first and second sweep arms, means swingably connecting the sweep arms to the base member, a plurality of tined raking members spaced apart from one another longitudinally along each of respective ones of the rake sweep arms for sweeping cut crop material lying on the ground into a windrow, the sweep arms diverging outwardly from one another in a direction forward away from the baler with reference to the direction of travel during baling and apparatus for laterally shifting marginal edge portions of the windrow relative to the path of travel of the baler during baling, the apparatus including first and second side delivery raking means located respectively on opposites sides of the windrow, means movably mounting the raking means for movement relative to the baler in directions toward and away from the path of travel.

A basket type tined raking reel for rotation in a plane disposed at an acute angle to the ground surface, the raking reel being a generally basket like circular unit having a central hub, an annular circular rim circumscribing the hub and disposed in selected spaced relation with respect thereto, a plurality of spokes anchored to the hub and having a first portion extending outwardly to the rim and means retaining the spokes in selected spaced relation with respect to one another circumferentially around the rim, at least selected ones of the spokes having a second portion extending beyond the rim and disposed at a selected angle relative to the first portion.

A collapsible and extendible wheel rake has at least one sweep arm swingably mounted on a draw bar, each such sweep arm comprising first and second hingedly interconnect rigid arm members, a plurality of tined raking wheels journalled for rotation on each of the first and second arm members and power means interconnecting the first and second members for moving the same from one position to another of where in a first rake operative position the first and second rigid members are disposed generally in alignment end-to-end and a second position wherein they are folded one upon the other in a storage, travel ready, inoperative position.

An object of the present invention is to provide apparatus that is used in association with a baling operation to divert the windrow laterally relative to the width of the baling area of the baler so to facilitate forming a suitable bale during baling.

A further object of the present invention is to provide a windrow diverter that is located forward of the pick-up and controllably operative to narrow the windrow to a width that is narrower than the width of the baler pick-up.

A further principal object of the present invention is to provide a windrow diverter that is controllably operative to direct the same toward one or the other end of the bale being formed.

A further object of the present invention is to provide a rake and windrow narrowing apparatus for use in association with a baler.

A further object of the present invention is to provide an elongate draw bar for use in connecting a tow vehicle to a baler and wherein a wide sweep rake and windrow narrowing apparatus are mounted on the tow bar.

A further object of the present invention is to provide a generally circular basket like tined reel raking reel that performs a raking function by rolling engagement and rotating in a plane disposed at an acute angle to the ground.

A further object of the present invention is to provide a tined wheel type rake in which the tine wheels are mounted on articulate sweep arms and thereby providing a wide sweep rake.

A further object of the present invention is to provide a circular basket like tined unit for use in raking cut material lying on the ground.

In keeping with the forgoing there is provided in accordance with one aspect of the present invention an improvement in a crop baling operation in which the cut material on the ground is picked up at an in-feed end of the baler and formed into a bale by the baler as it moves forward such improvement comprising incorporating apparatus proximate the in-feed to the baler to controllably laterally shift at least at least marginal edge portions of the windrow relative to the path of travel of the baler, the apparatus including first and second side delivery raking means located respectively on opposites sides of the windrow, means movably mounting the raking means for movement relative to the baler in directions toward and away from the path of travel and means for selectively controlling movement of the raking means.

In accordance with a further aspect of the present invention there is provided a basket type tined raking reel for rotation in a plane disposed at preselected acute angle to the ground surface, the raking reel being a generally basket like circular unit having a central hub, an annular circular rim circumscribing the hub and disposed in selected spaced relation with respect thereto, a plurality of spokes anchored to the hub and having a first portion extending outwardly to the rim, means retaining the spokes in selected spaced relation with respect to one another circumferentially around the rim and at least selected ones of the spokes having a second portion extending beyond the rim, the second spoke portion being disposed at a selected angle to the first portion.

In accordance with a further aspect of the present invention there is provided a rake having at least one sweep arm swingably mounted on a draw bar, each such sweep arm comprising first and second hingedly interconnect rigid arm members, a plurality of tined raking wheels journalled for rotation on each of the first and second members and power means interconnecting the first and second members for moving the same from one position to another of where in a first rake operative position the first and second rigid members are disposed in alignment end to end and a second position wherein they are folded one upon the other in a travel ready inoperative position.

Furthermore, a preferred embodiment of the present invention comprises, consists of or consists essentially of a hay baling assembly for cooperatively engaging a tractor providing towing and hydraulic power comprising an elongated longitudinal draw bar or tow bar defining a rigidly and permanently extending tongue connecting a hay baler to the tractor and supporting structure for the windrow diverter apparatus and collapsible and extendible wheel rake booms all of which may include hydraulic cylinder means in fluid communication therewith. The hay baler including a pick-up for feeding cut hay into a roll forming cavity located within the hay baler for baling. A collapsible wheel rake mounts on and is supported by the elongated draw bar of a selected length to allow folding of the rake arms between the tractor and baler for transport. A crossbar is positioned in front of the baler pick-up, to support the windrow diverter apparatus. The extendible and collapsible wheel sweep rake includes at least a first arm and preferably a first and a second articulated swing arm hingedly connecting to opposing ends of the crossbar supported by the elongated draw bar operable by at least one hydraulic cylinder connecting each one of the swing arm to the draw bar and in fluid communication with the hydraulic power of the tractor. The first and the second articulated swing arms diverge outwardly from a contracted transport position adjacent the elongated draw bar in an outwardly direction generally opposite from one another at a selected angle and distance in an extended position. Each of the swing arms including a plurality of tined sweep raking wheels rotatably mounting on the swing arms at a selected acute angle to the ground surface, and each swing arm including at least one caster wheel unit for supporting the swing arm while in the extended position. A windrow crowder and diverter including means for mounting on the elongated draw bar behind the sweep rake and the sweep raking wheels and in front of the baler pick-up. The windrow crowder and diverter comprise at least one pair of tined diverter raking units comprising wheels or baskets rotatably and swingably mounting onto an assembly extending from a frame member defining a crossbar supported by the elongated draw bar, each one of the at least one pair of tined diverter raking units is positioned to rotate in a plane inclined at a selected acute angle to the horizontal causing the tined diverter raking unit to rotate by frictional engagement with the ground during the raking and baling operation. Each tined diverter raking wheel unit comprises a hub with a plurality of spokes extending outwardly therefrom maintained in circumferential spaced apart relation by an annular rim circumscribing and radially spaced apart from the hub, each spoke including a portion extending from the hub. In addition, the basket raking wheel units include a portion of the spokes being angularly disposed and projecting from the annular rim, the spokes defining a generally cylindrical conical open wall whose axis coincide with the axis of rotation. The hub of the raking wheels detachably attach to holding means such a rotatable plate on an end of a shaft journalled for rotation proximate the lower end of a first post extending from an upper and lower spaced apart pair of links pivotally attaching to a second post extending from the crossbar including diagonal link connecting the upper and lower links. At least one tension spring connects to the tined diverter raking unit providing counterbalancing means for allowing the tined diverter raking unit to float at a raking level with a selected tined arc portion engaging the ground during raking, with each one of the tined diverter raking units including a lift means such as a hydraulic cylinder in fluid communication with the hydraulic power of the tractor. the hydraulic cylinder includes a first end mounting to the crossbar and a second end connecting to the second post of the tined diverter raking unit mounted and controllably movable for shifting a marginal edge of a windrow of hay laterally to a selected position with respect to the baler pick-up diverting the narrower windrow to a selected different position laterally across the width of the baler pick-up as needed for providing a sufficient amount of hay for forming a suitable bale.

The hay baler with windrow pickup diverter and extendible wheel rake mounting on the elongated drawbar further comprises, consists of or consists essentially of a hay baler such as a roll baler including a pick-up for feeding cut hay into a roll forming cavity located within the hay baler for baling and a windrow crowder and diverter including means for mounting in front of the pick-up. The windrow crowder and diverter comprises at least one pair of tined diverter raking wheels rotatably and swingably mounting onto an assembly extending from a frame member supported by the elongated draw bar. In a preferred embodiment the windrow crowder and diverter including at least one hydraulic cylinder in fluid communication with the hydraulic power of the tractor and controllably movable for shifting a marginal edge of a windrow of hay laterally to a selected position with respect to the baler pick-up diverting the narrower windrow to a selected different positions laterally across the width of the baler pick-up as needed for providing a sufficient amount of hay for forming a suitable bale. Moreover, the windrow diverter assembly can be in electrical communication with a control unit mounted on a tractor which includes sensor means to detect the size of a hay bale on each lateral wall of the baling chamber of a baler by width or diameter of a round bale forming in the baler. The control unit may also include a computer to sent electronic signals to the windrow diverter to position the windrow strip in front of the baler pickup to move the diverter from side to side during baling to form a bale of uniform diameter.

Each tined diverter raking wheel can rotate in a plane inclined at a selected acute angle to the horizontal and is caused to rotate by frictional engagement with the ground. A power unit means can be used to raise and lower the tined diverter raking wheels to a transport level and lowering the tined raking wheels to a floating raking level.

In another preferred embodiment, the hay baling assembly for cooperatively engaging a tractor providing towing and hydraulic power comprises, consists of or consisting essentially of an elongated draw bar connecting a hay baler to the tractor in hydraulic communication therewith. The hay baler including a pick-up for feeding cut hay into a roll forming cavity located within the hay baler for baling. A sweep rake supported by the elongated draw bar, between the crossbar positioned in front of the baler pick-up, the sweep rake including a first and a second articulated swing arm hingedly connecting to opposing ends of the crossbar supported by the elongated draw bar operable by at least one hydraulic cylinder connecting each one of the swing arms to the draw bar and in fluid communication with the hydraulic power of the tractor, the first and the second articulated swing arms diverging outwardly from a contracted transport position adjacent the elongated draw bar in an outwardly direction generally opposite from one another at a selected angle and distance in an extended position each of the swing arms including a plurality of tined sweep raking wheels rotatably mounting on the swing arms at a selected acute angle to the ground surface, and each swing arm including at least one caster wheel unit for supporting the swing arm while in the extended position. A windrow crowder and diverter including means for mounting on the elongated draw bar and behind the sweep rake and the sweep raking wheels and in front of the baler pick-up, the windrow crowder and diverter comprising at least one pair of tined diverter raking units rotatably and swingably mounting onto an assembly extending from a frame member defining a crossbar supported by the elongated draw bar, each one of the at least one pair of tined diverter raking units is positioned to rotate in a plane inclined at a selected acute angle to the horizontal causing the tined diverter raking unit to rotate by frictional engagement with the ground during the raking and baling operation. Each tined diverter raking unit defines a wheel or a basket type tined raking reel which comprises a hub including a first portion including a plurality of spokes extending outwardly therefrom maintained in circumferential spaced apart relation by an annular rim circumscribing and radially spaced apart from the hub, and each of the plurality of the spokes extend from the hub to the rim of each spoke including a portion extending from the hub angularly disposed and projecting from the annular rim, the basket type tined raking reel including a second portion angularly disposed with respect to the first portion and projecting from the rim with the second portion located in a plane disposed generally perpendicular to the axis of rotation defining a generally perpendicular to the axis of rotation defining a generally cylindrical or truncated conical open wall whose axis coincides with the axis of rotation with the spokes passing through a respective one of a plurality of circumferentially spaced apart holes disposed in the rim and held in spaced apart relation, the hub detachably attaching to a plate on an end of a shaft journalled for rotation proximate the lower end of a first post extending from an upper and lower spaced apart pair of links pivotally attaching to a second post extending from the crossbar including diagonal link connecting the upper and lower links and at least one tension spring connecting to the tined diverter raking unit providing counterbalancing means for allowing the tined diverter raking unit to float at a raking level with a selected tined arc portion engaging the ground during raking, with each one of the tined diverter raking units including a hydraulic cylinder in fluid communication with the hydraulic power of the tractor, the hydraulic cylinder including a first end mounting to the crossbar and a second end connecting to the second post of the tined diverter raking unit mounted and controllably movable for shifting a marginal edge of a windrow of hay laterally to a selected position with respect to the baler pick-up diverting the narrower windrow to a selected different position laterally across the width of the baler pick-up as needed for providing a sufficient amount of hay for forming a suitable bale.

BRIEF DESCRIPTION OF THE DRAWINGS

A better understanding of the present invention will be had upon reference to the following description in conjunction with the accompanying drawings in which like numerals refer to like parts throughout the views wherein:

FIG. 14 shows a side view of a tractor towing a roll type baler with a rake and windrow diverting mechanism mounted on the drawbar there between;

DETAILED DESCRIPTION OF THE PREFERRED EMBODIMENT

Figure 1:
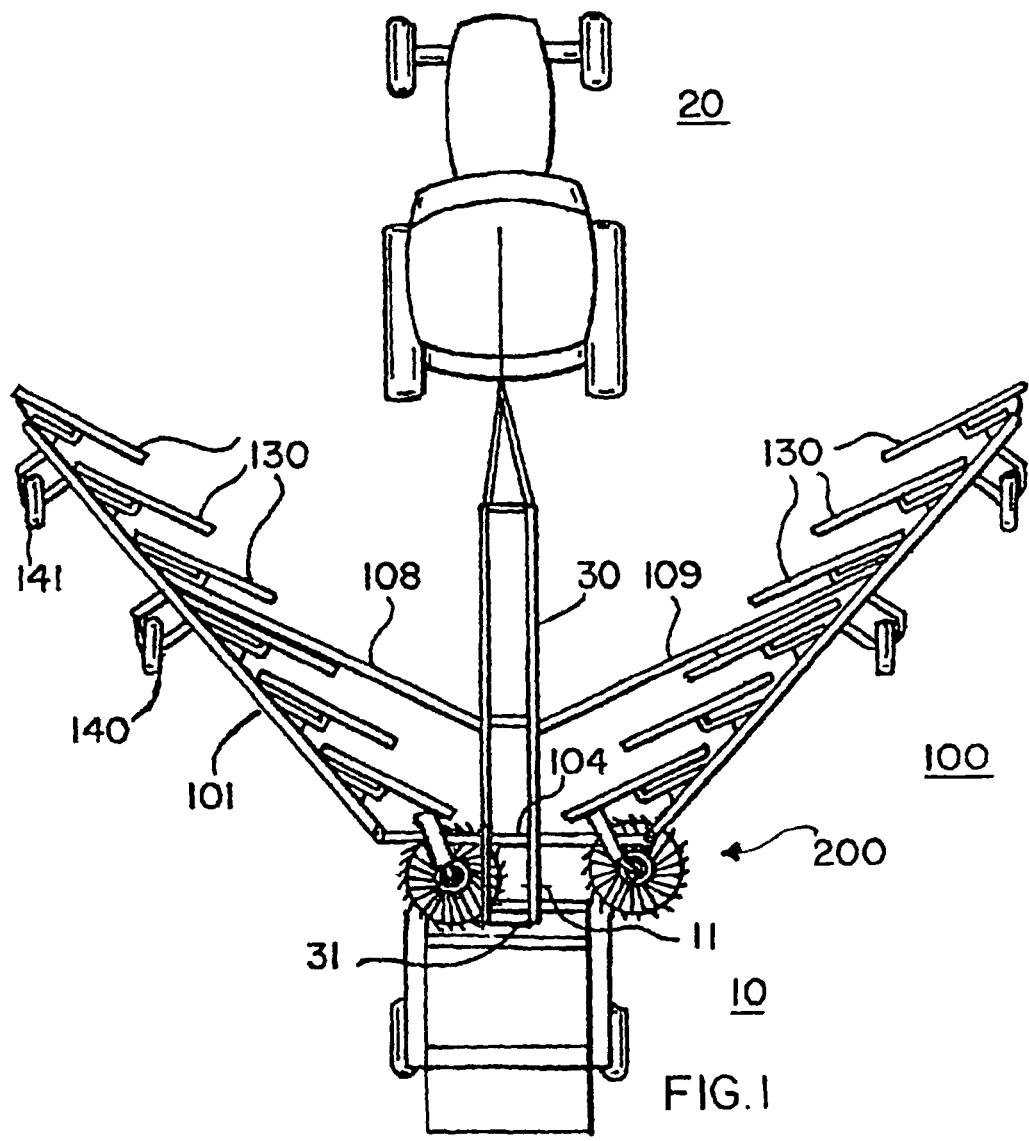
FIG. 1 is a top plan view of applicants tractor drawn rake and baler incorporating a windrow shifting mechanism proximate the in-feed to the baler and wherein the rake has articulated sweep arms.
Figure 2:
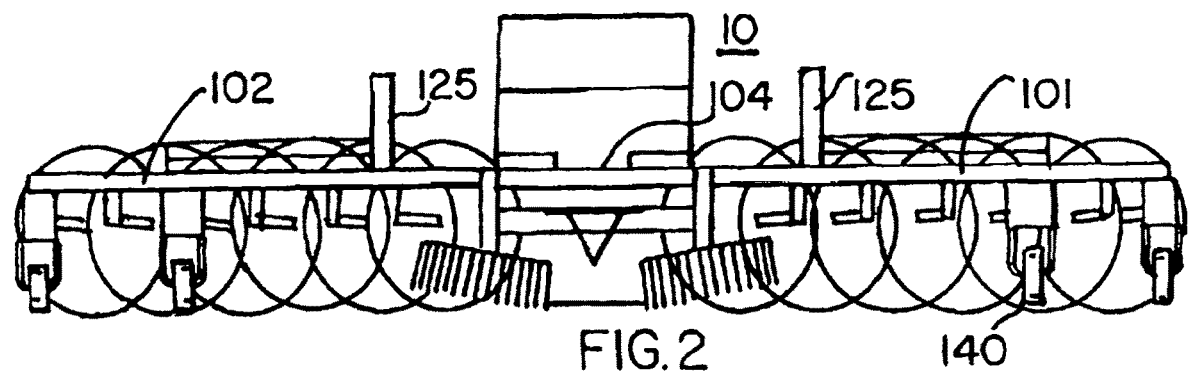
FIG. 2 is a front view of the rake and baler portion of applicants apparatus taken essentially along line 2-2 of FIG. 1.
Figure 12:
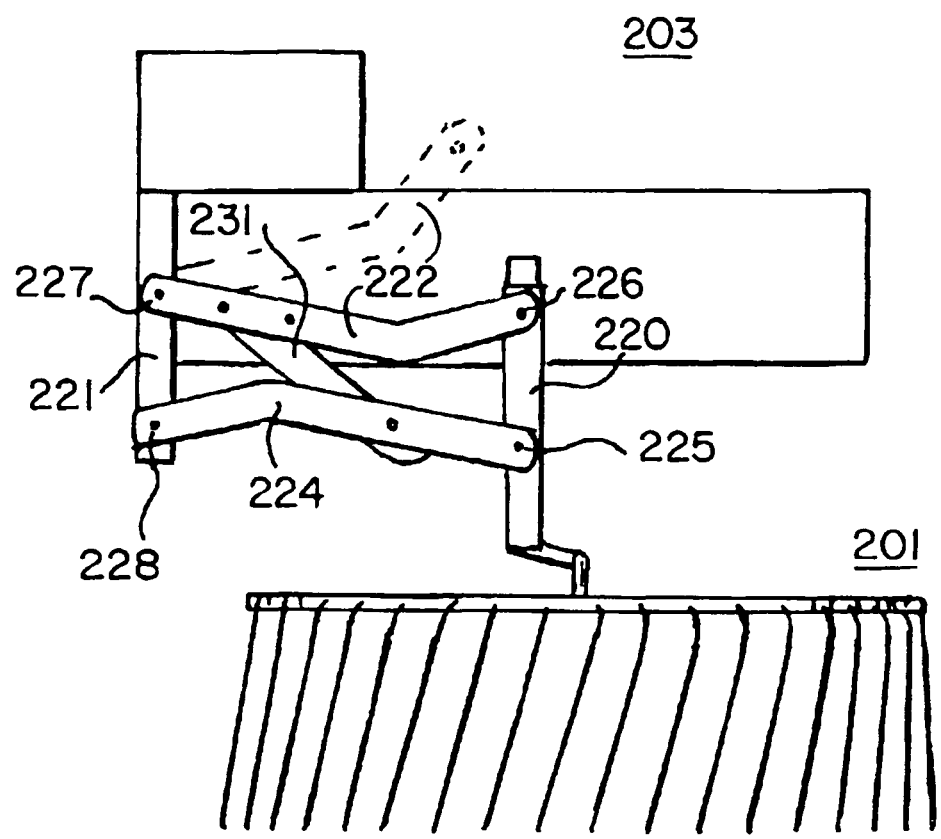
FIG. 12 is a side elevational view of the diverter mechanism shown in FIG. 11.
Figure 13:
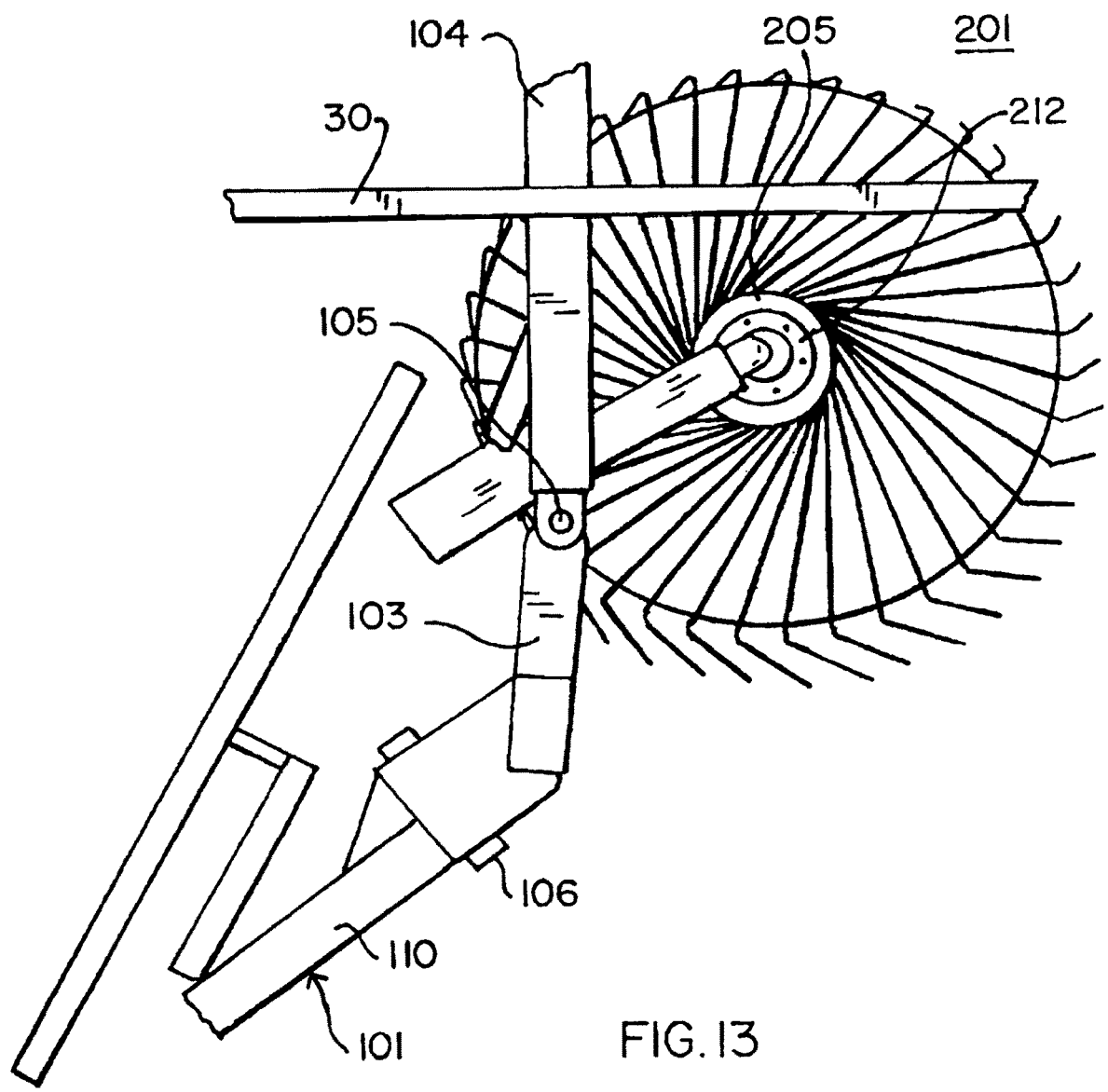
FIG. 13 is a top plan view of the diverter mechanism shown in FIG. 11.
Figure 14:
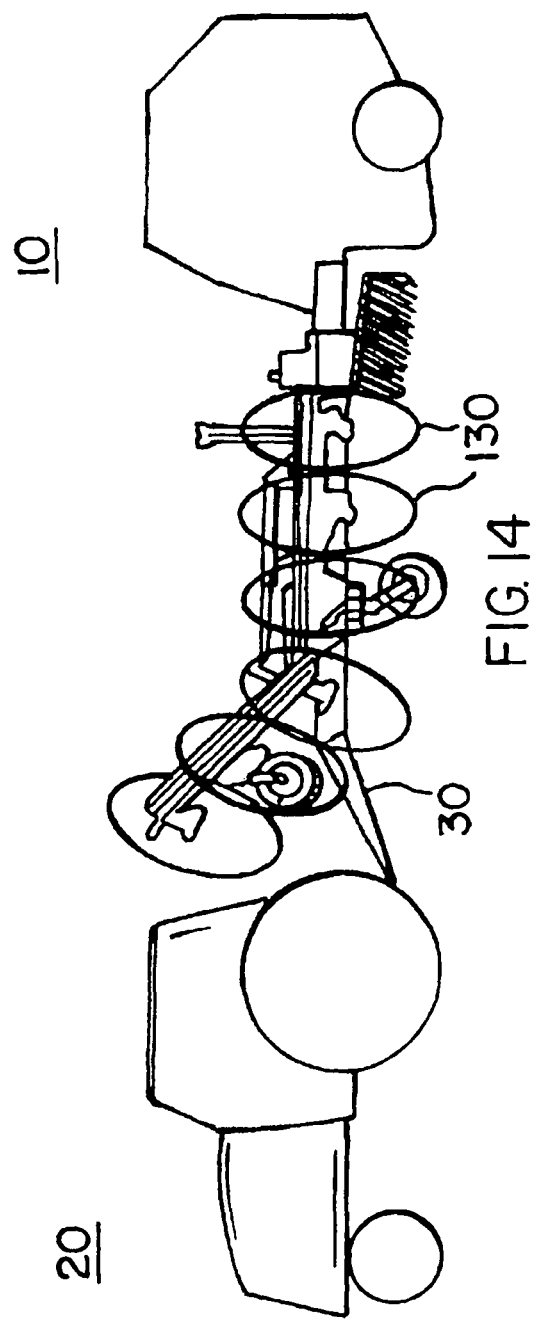
Figure 15:
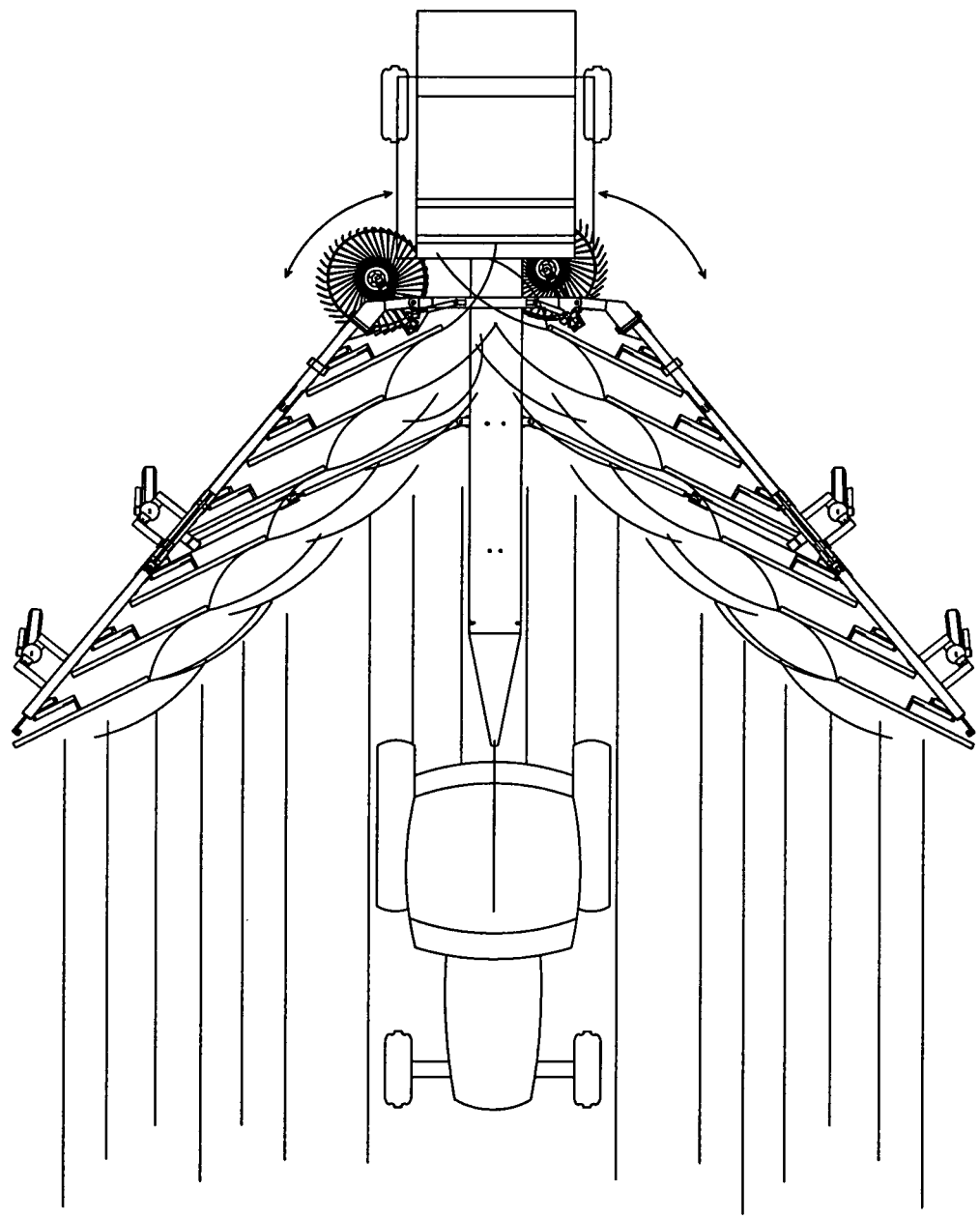
FIG. 15 is a top view showing the rake sweep arms opened to rake three nine foot swathes equaling a twenty-seven feet swath and the diverter basket moving in and back independently to divert hay to the side of the baler pickup as needed.
Figure 16:
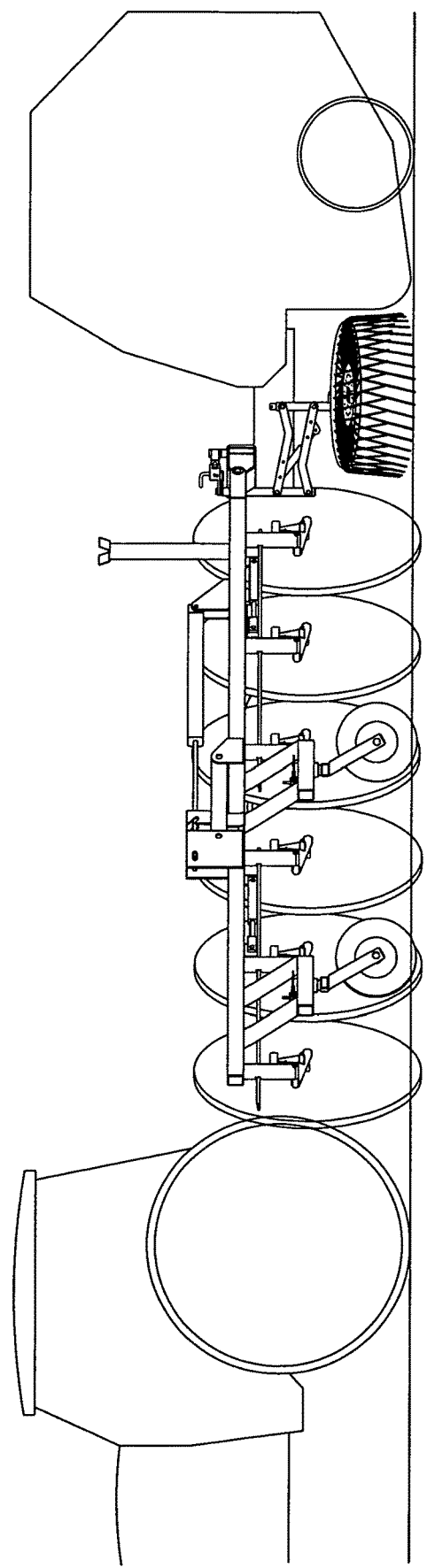
FIG. 16 is a side view showing the rake, diverter, and baler in the down, expanded and in use position.
Figure 17:
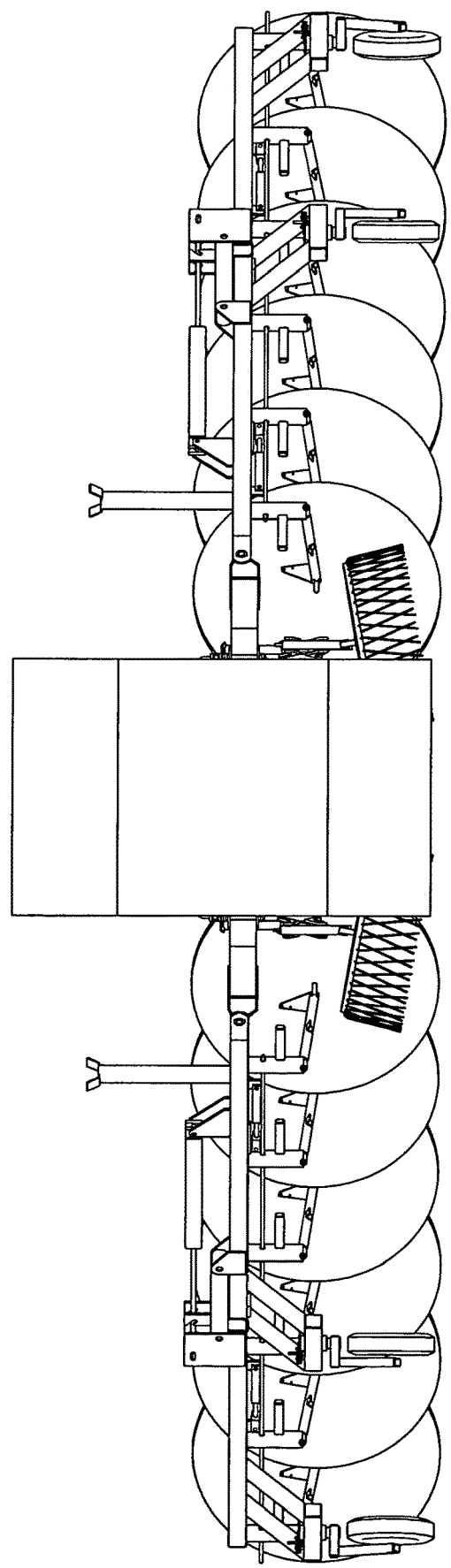
FIG. 17 is a rear view showing the rake, diverter, and baler in the down, expanded and in use position.
Figure 18:
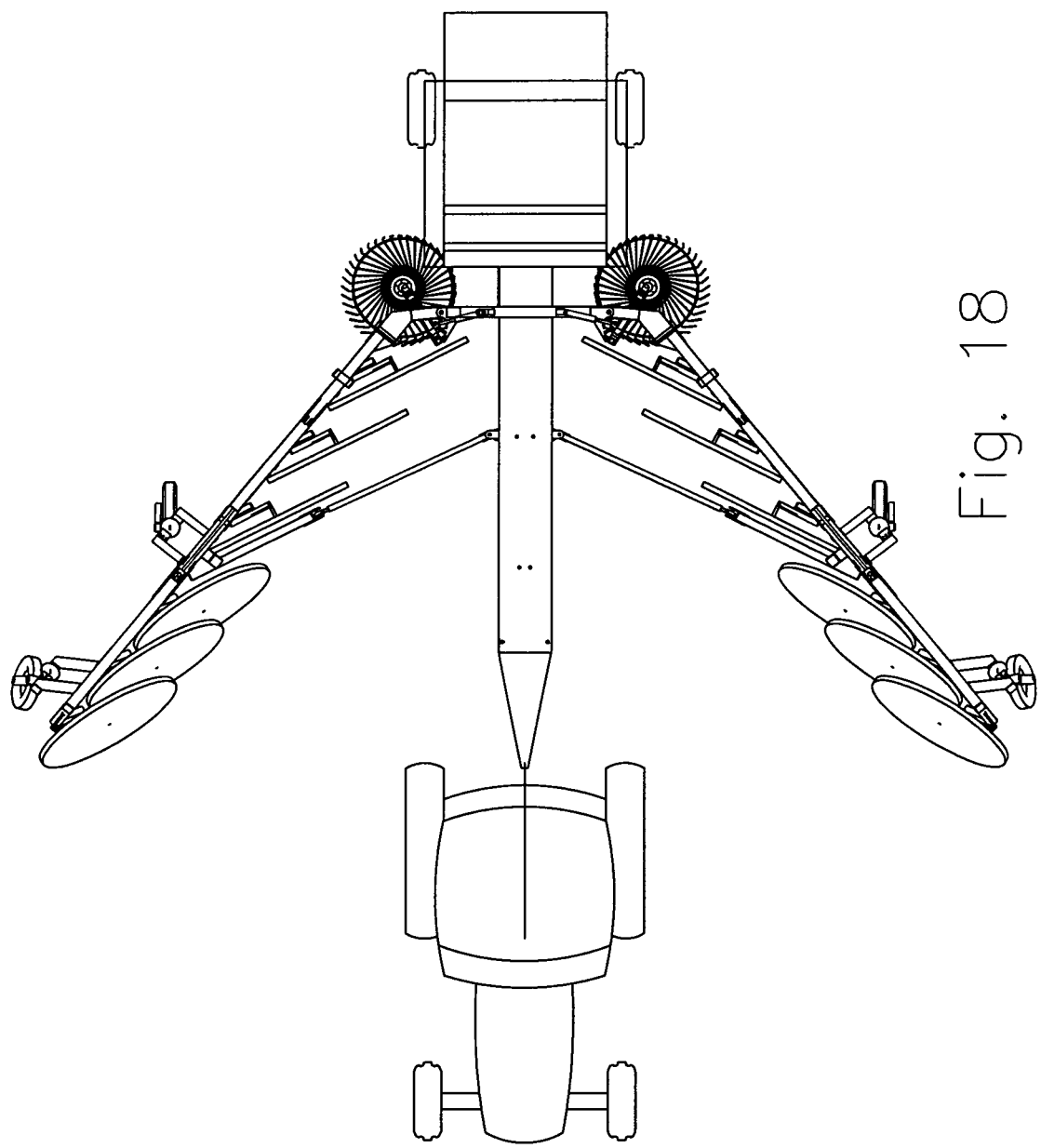
FIG. 18 is a top view showing the outer wheels and tines of the rake folding first to prevent collision with the tractor.
Figure 19:
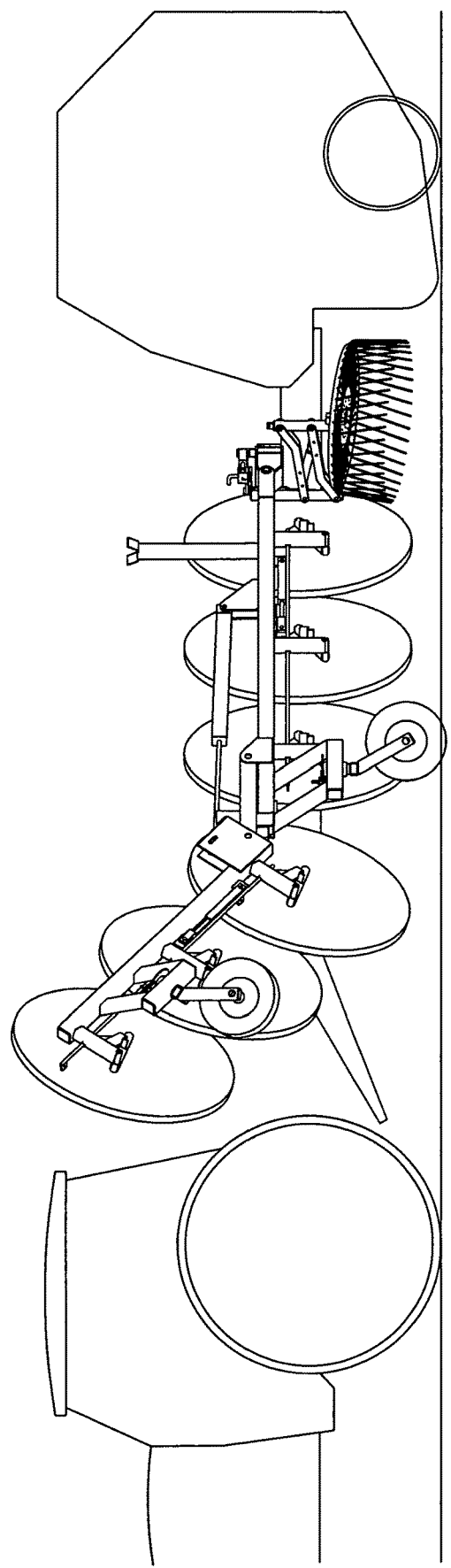
FIG. 19 is a side view showing the outer wheels and tines of the rake folding first to prevent collision with the tractor.
Figure 20:
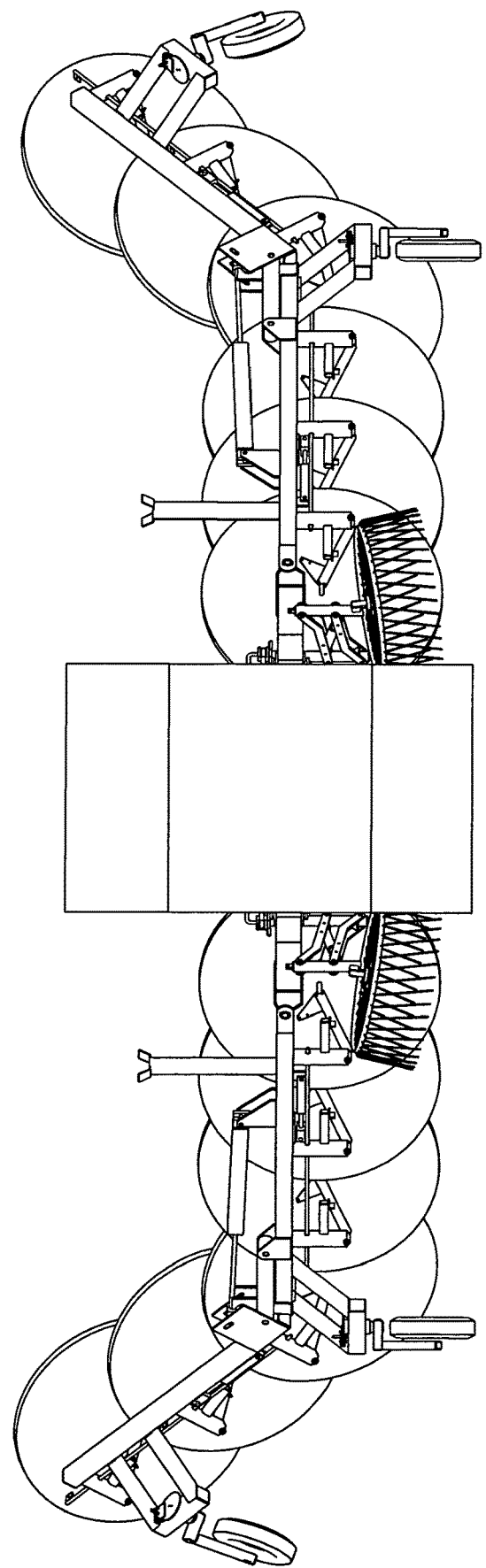
FIG. 20 is a rear view showing the outer wheels and tines of the rake folding first to prevent collision with the tractor.
Figure 21:
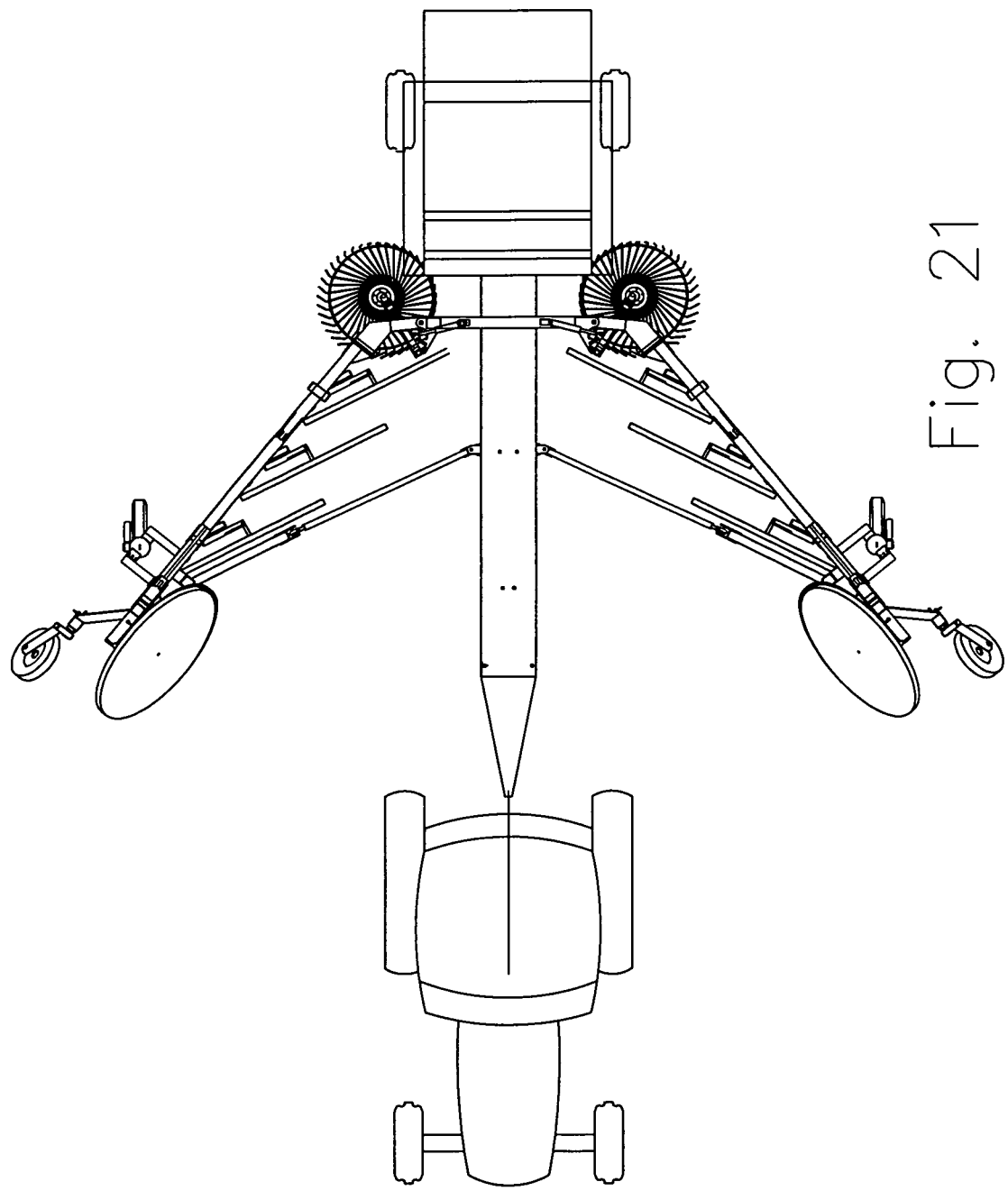
FIG. 21 is a top view showing the outer wheels and tines of the rake folding up upward to 90 degrees to prevent collision with the tractor.
Figure 22:
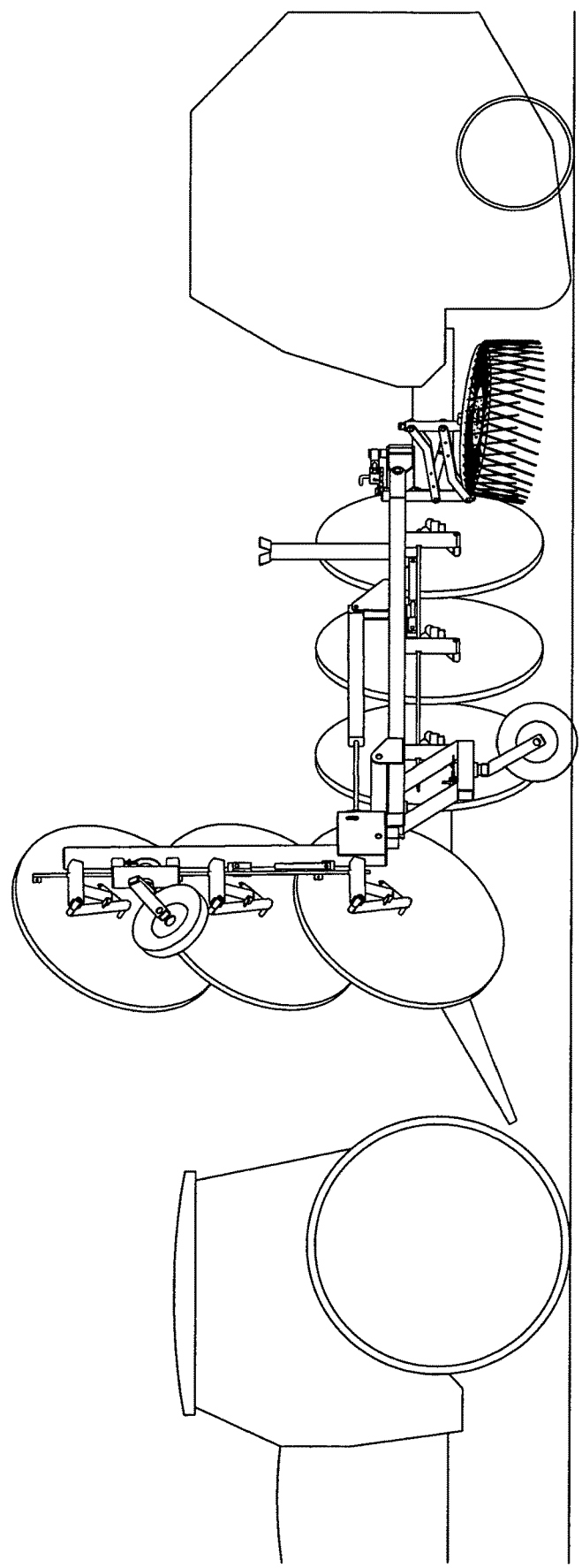
FIG. 22 is a side view showing the outer wheels and tines of the rake folding upward to 90 degrees to prevent collision with the tractor.
Figure 23:
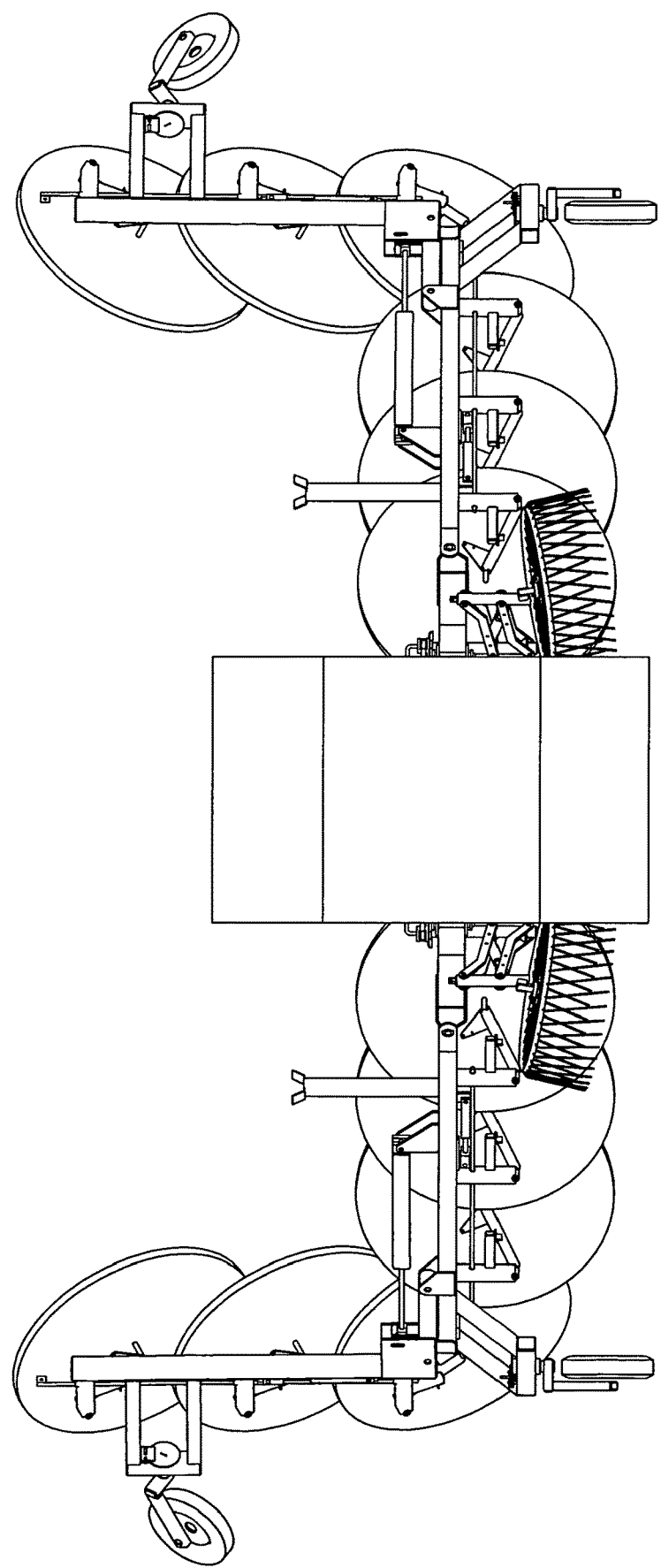
FIG. 23 is a rear view showing the outer wheels and tines of the rake folding upward to 90 degrees to prevent collision with the tractor.
Figure 24:
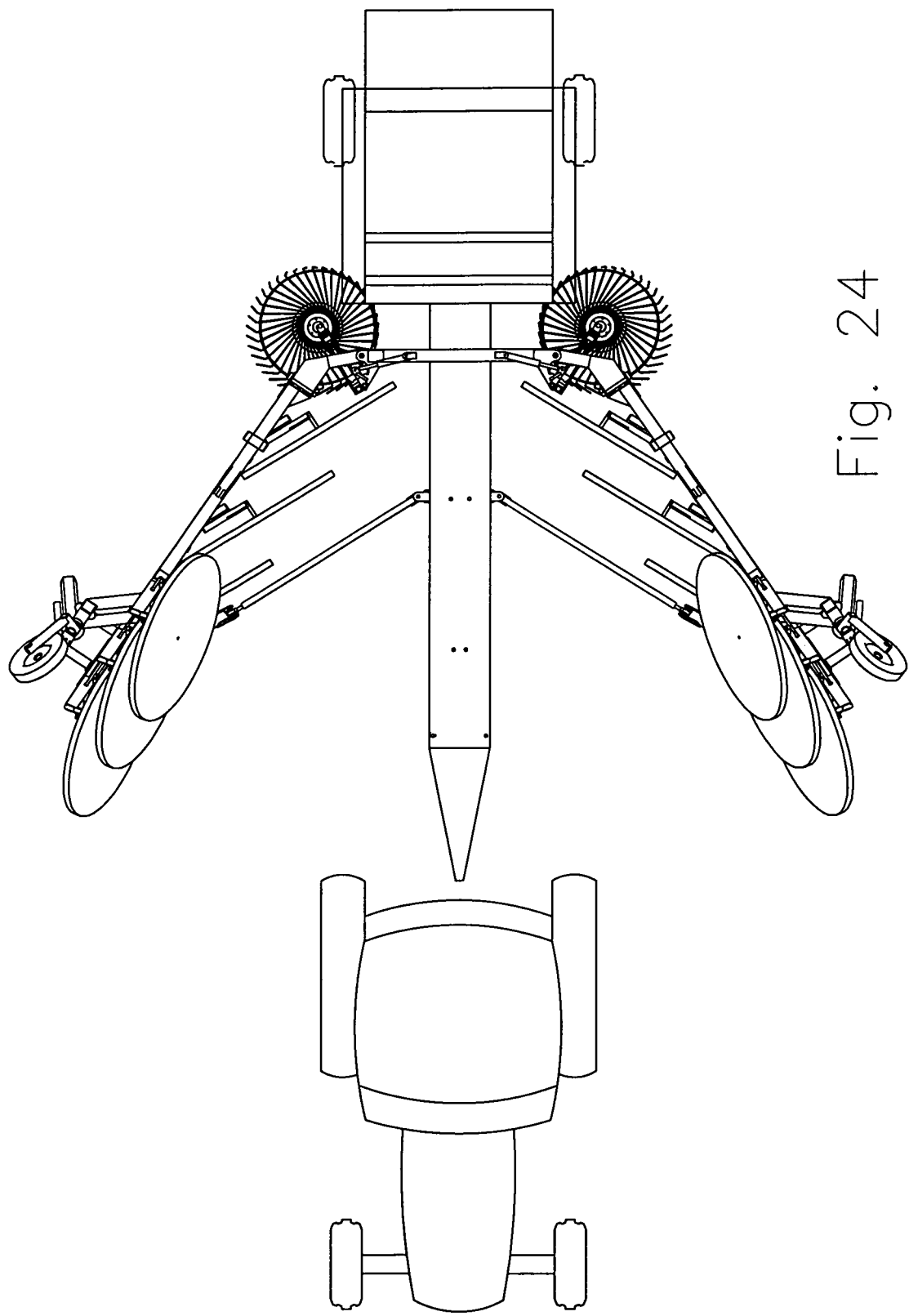
FIG. 24 is a top view showing the outer wheels and tines of the rake folded upward to 90 degrees then the second pivot begins to fold the rake arm. and wheel with tines inwardly toward the draw bar.
Figure 25:
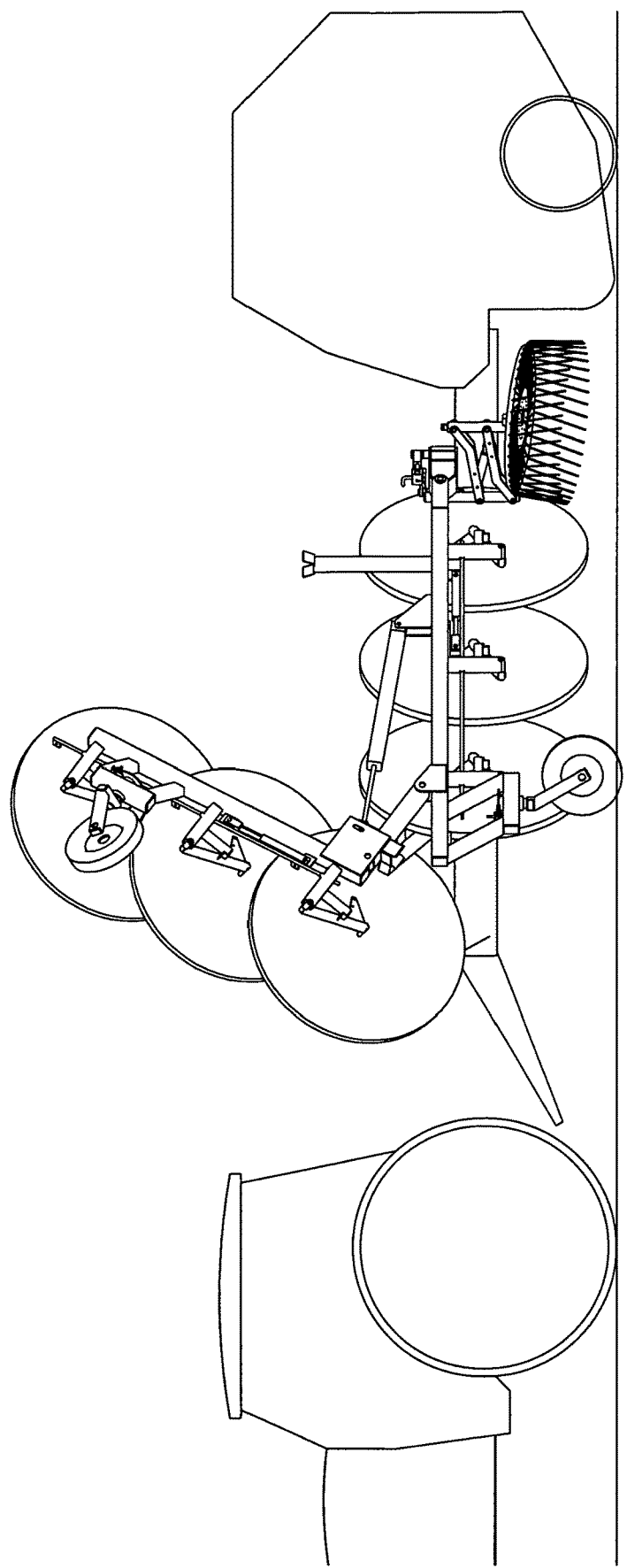
FIG. 25 is a side view showing the outer wheels and tines of the rake folded upward to 90 degrees then the second pivot begins to fold the rake arm. and wheel with tines inwardly toward the draw bar.
Figure 26:
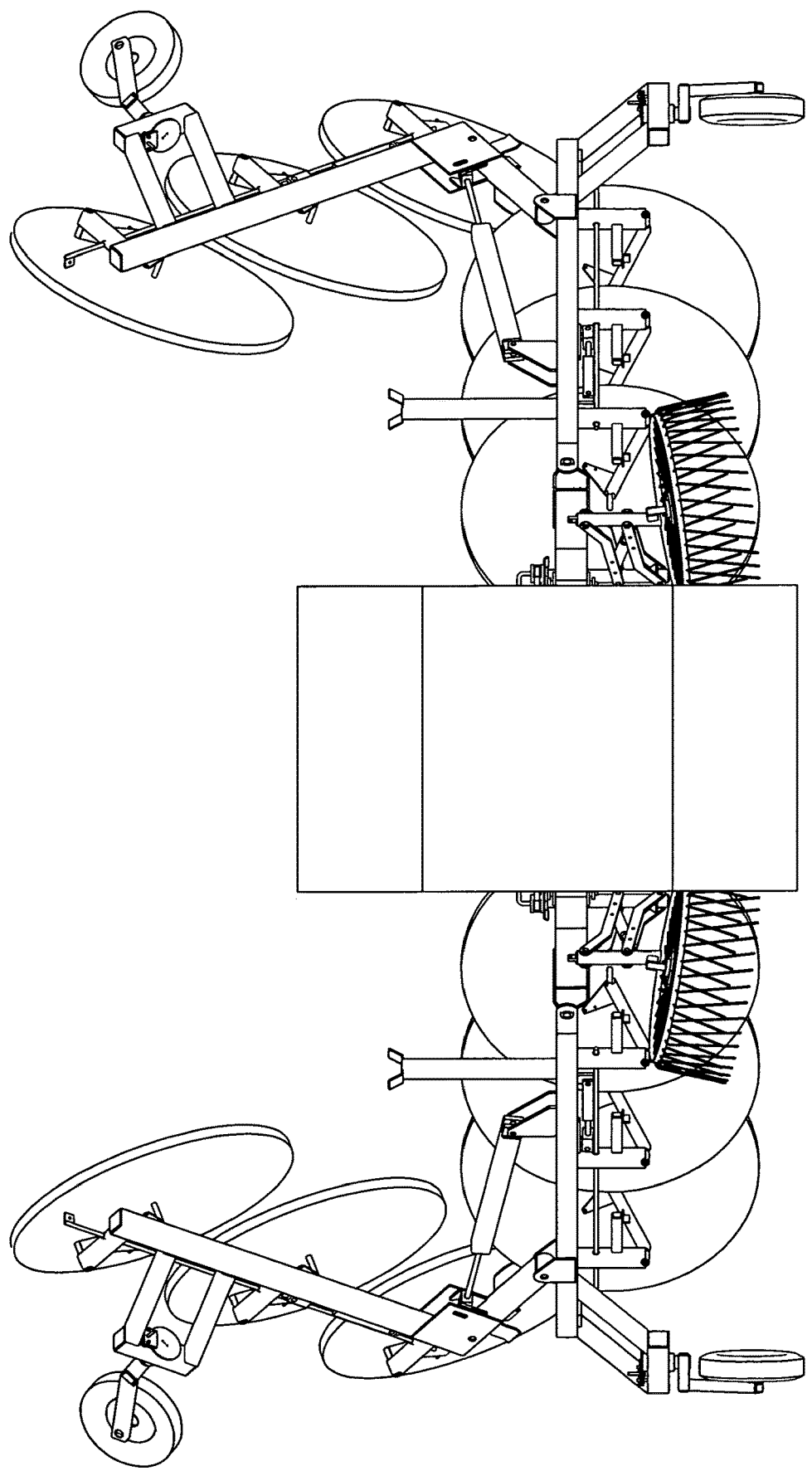
FIG. 26 is a rear view showing the outer wheels and tines of the rake folded upward to 90 degrees then the second pivot begins to fold the rake arm. and wheel with tines inwardly toward the draw bar.
Figure 27:
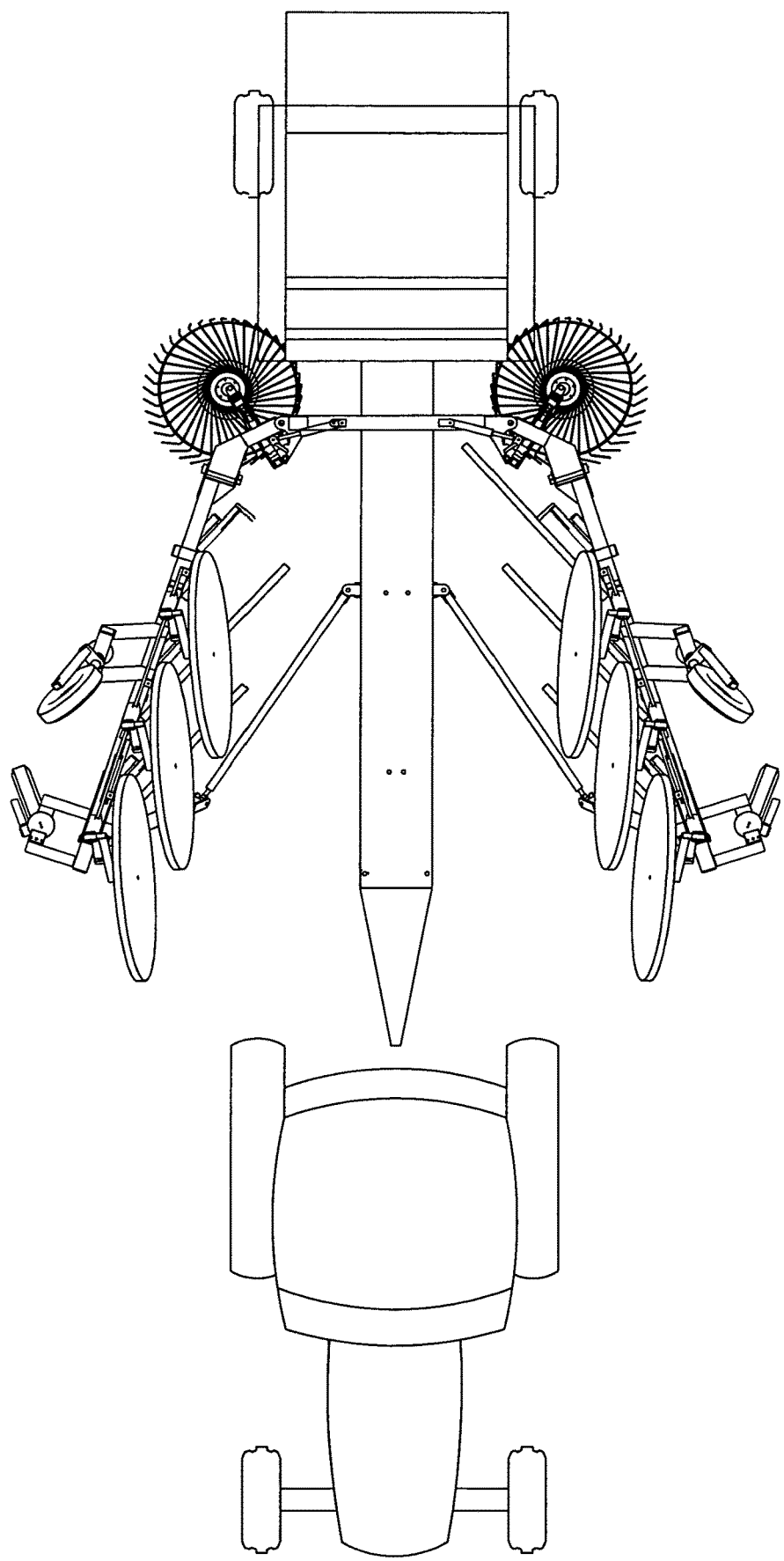
FIG. 27 is a top view showing that as the second pivot begins to fold the interior rake wheels and tines are pulled inward toward the draw bar.
Figure 28:
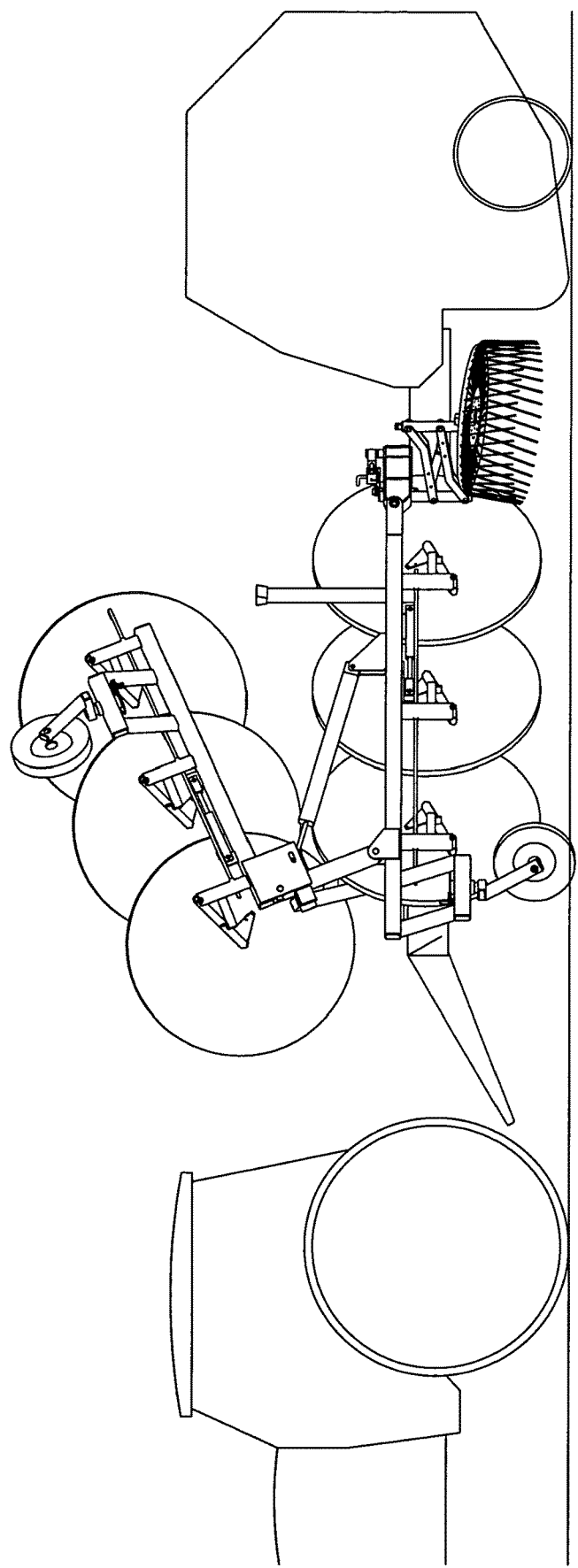
FIG. 28 is a side view showing that as the second pivot begins to fold the interior rake wheels and tines are pulled inward toward the draw bar.
Figure 29:
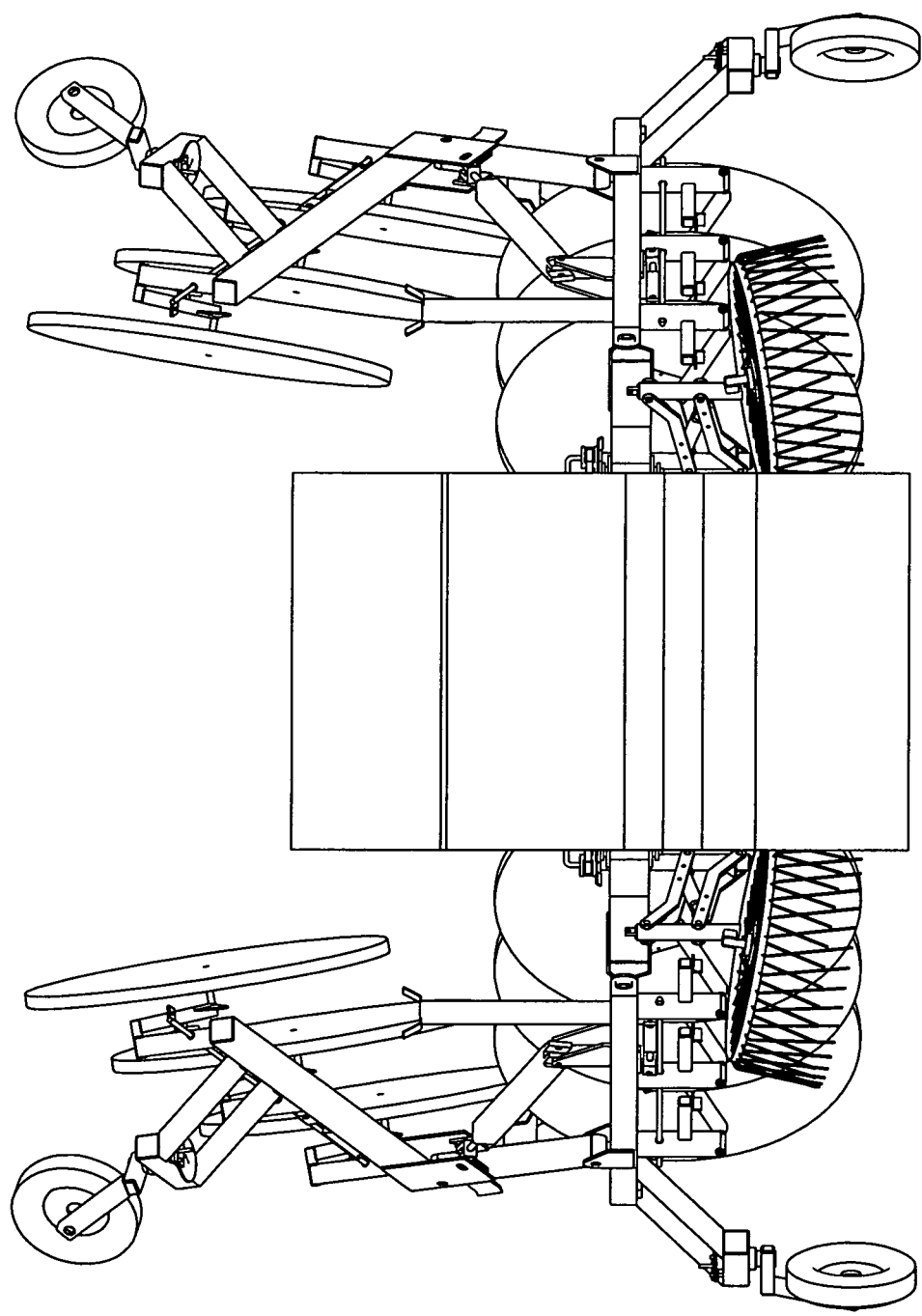
FIG. 29 is a rear view showing that as the second pivot begins to fold the interior rake wheels and tines are pulled inward toward the draw bar.
Figure 30:
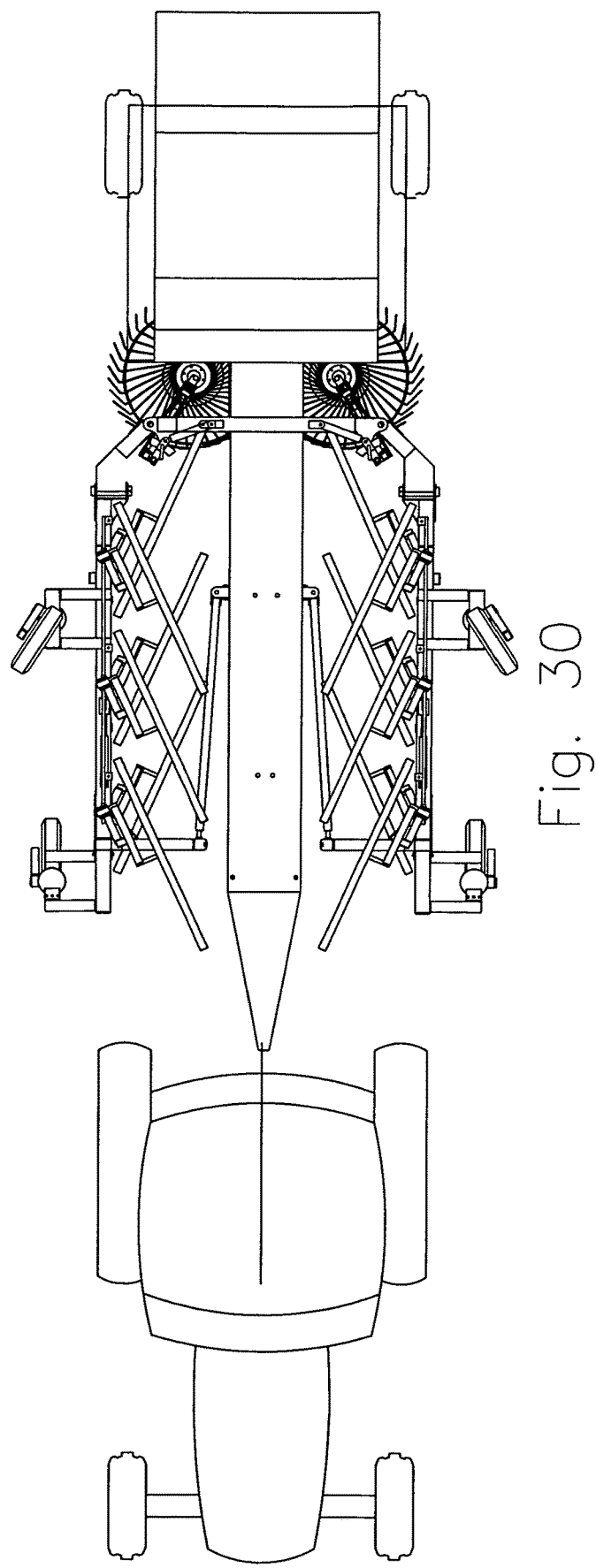
FIG. 30 is a top view showing the baskets of the windrow diverter and arms of the rake pulled inwardly toward the draw bar to a road width of less than 10 feet 4 and ¼ inches maximum road transport width.
Figure 31:
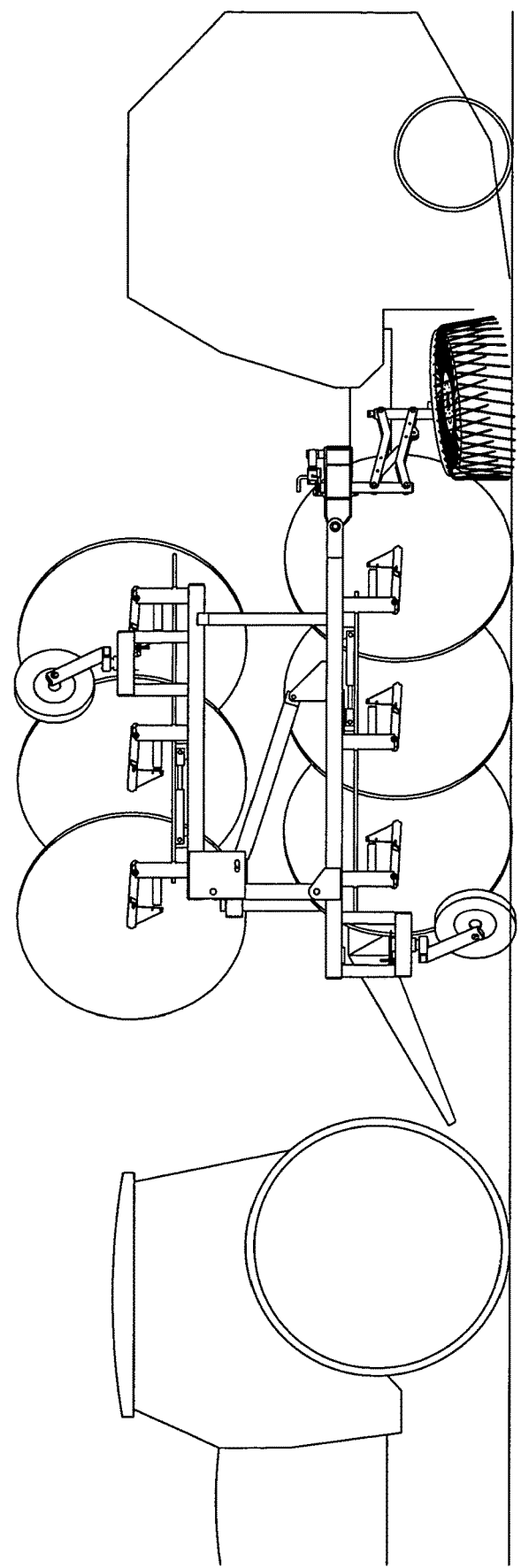
FIG. 31 is a side view showing the baskets of the windrow diverter and arms of the rake pulled inwardly toward the draw bar to a road width of less than 10 feet 4 and ½ inches maximum road transport width.
Figure 32:
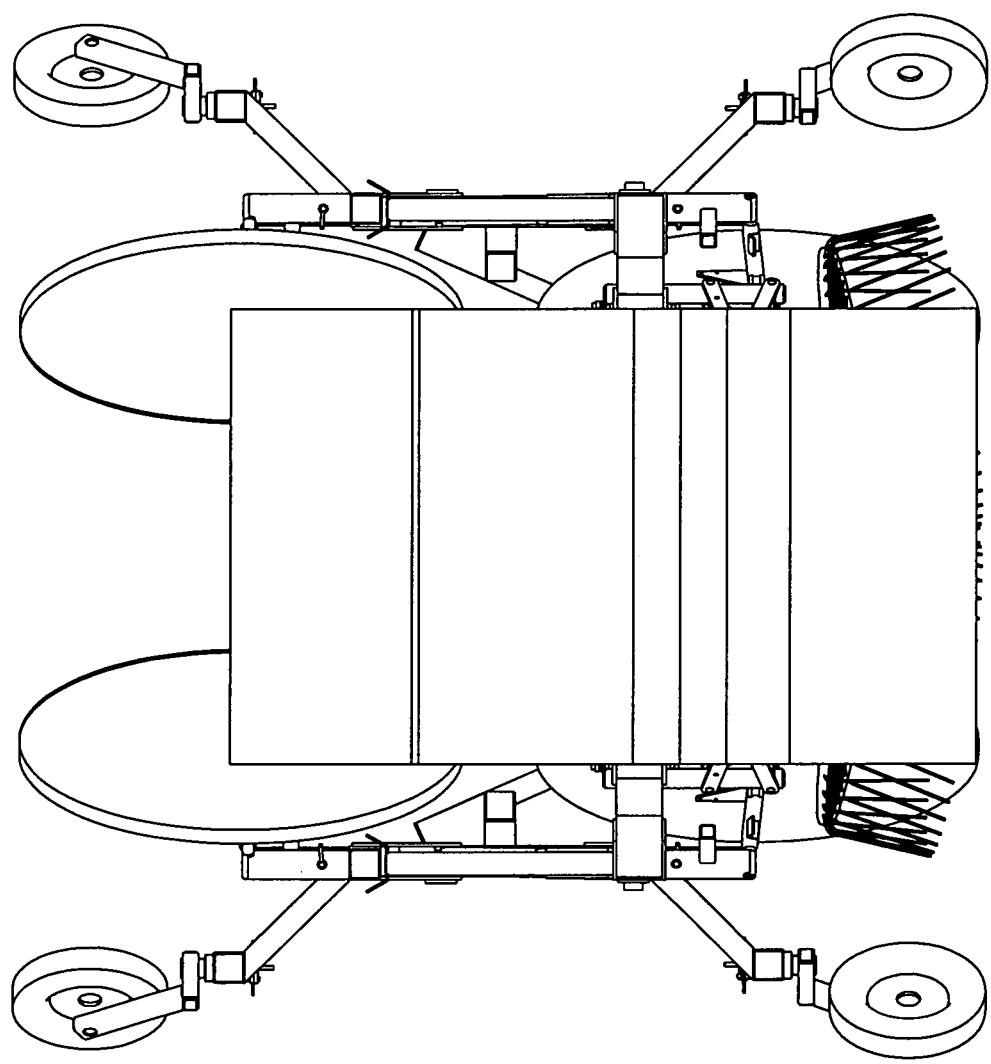
FIG. 32 is a rear view showing the baskets of the windrow diverter and arms of the rake pulled inwardly toward the draw bar to a road width of less than 10 feet 4 and ½ inches maximum road transport width.
Figure 33:
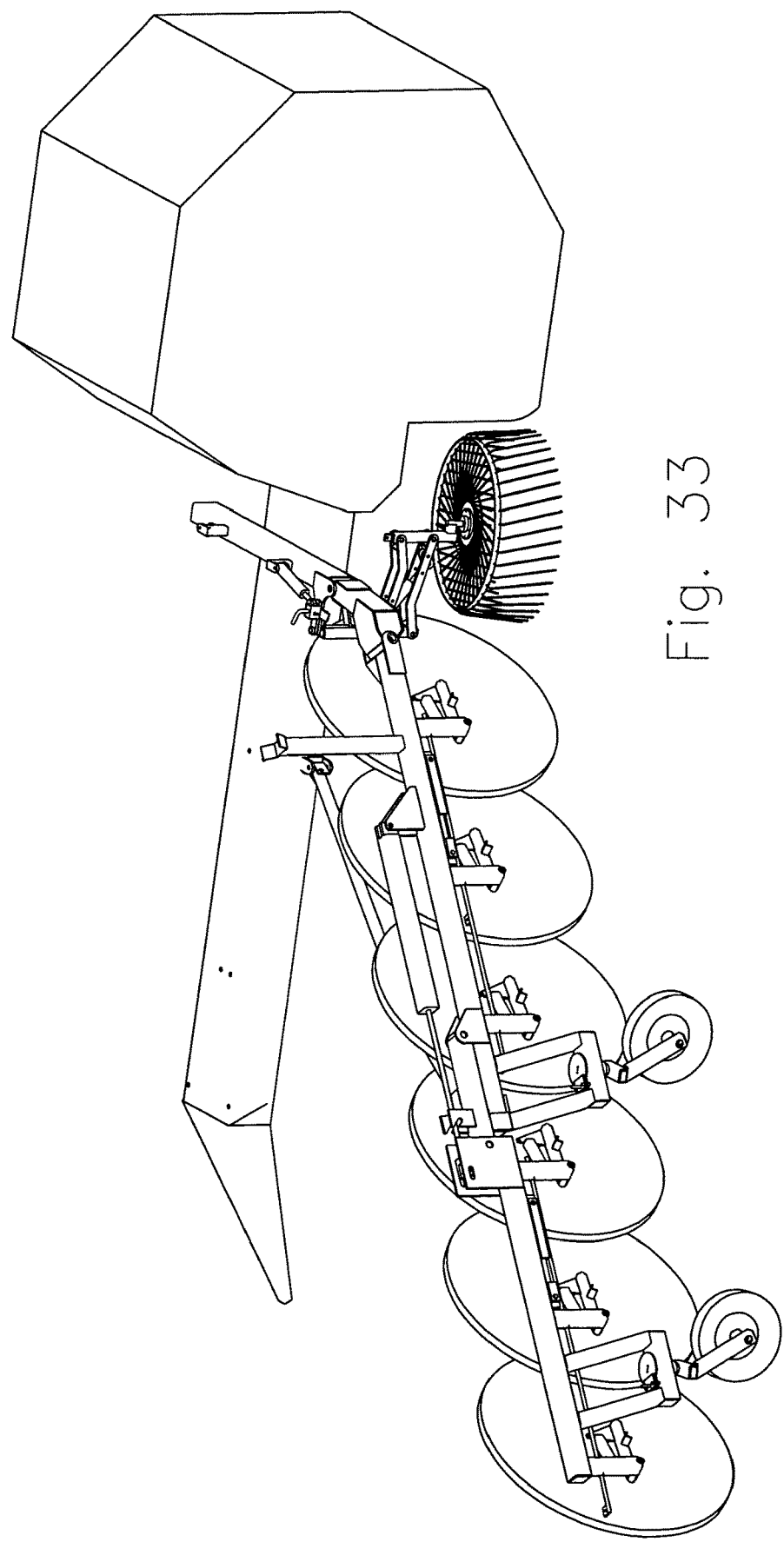
FIG. 33 is a perspective view showing the windrow diverter basket and rake arms with rake wheels and tines in the expanded field use position.
Figure 34:
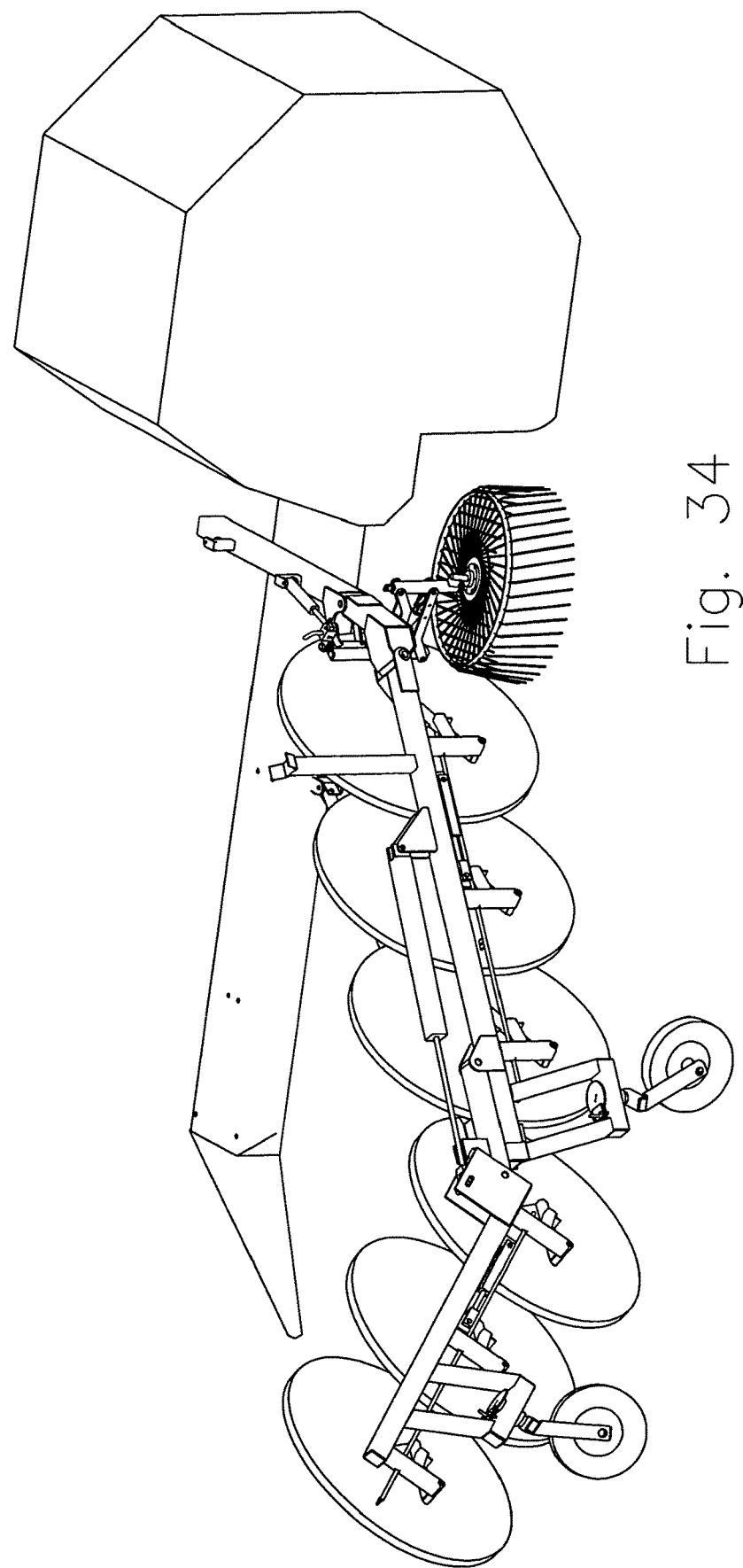
FIG. 34 is a perspective view of the device shown in FIG. 33 showing the windrow diverter basket and rake arms with rake wheels and tines in the expanded field use position with the outer rake arm and rake wheels folding first when collapsing the rake for transport.
Figure 35:
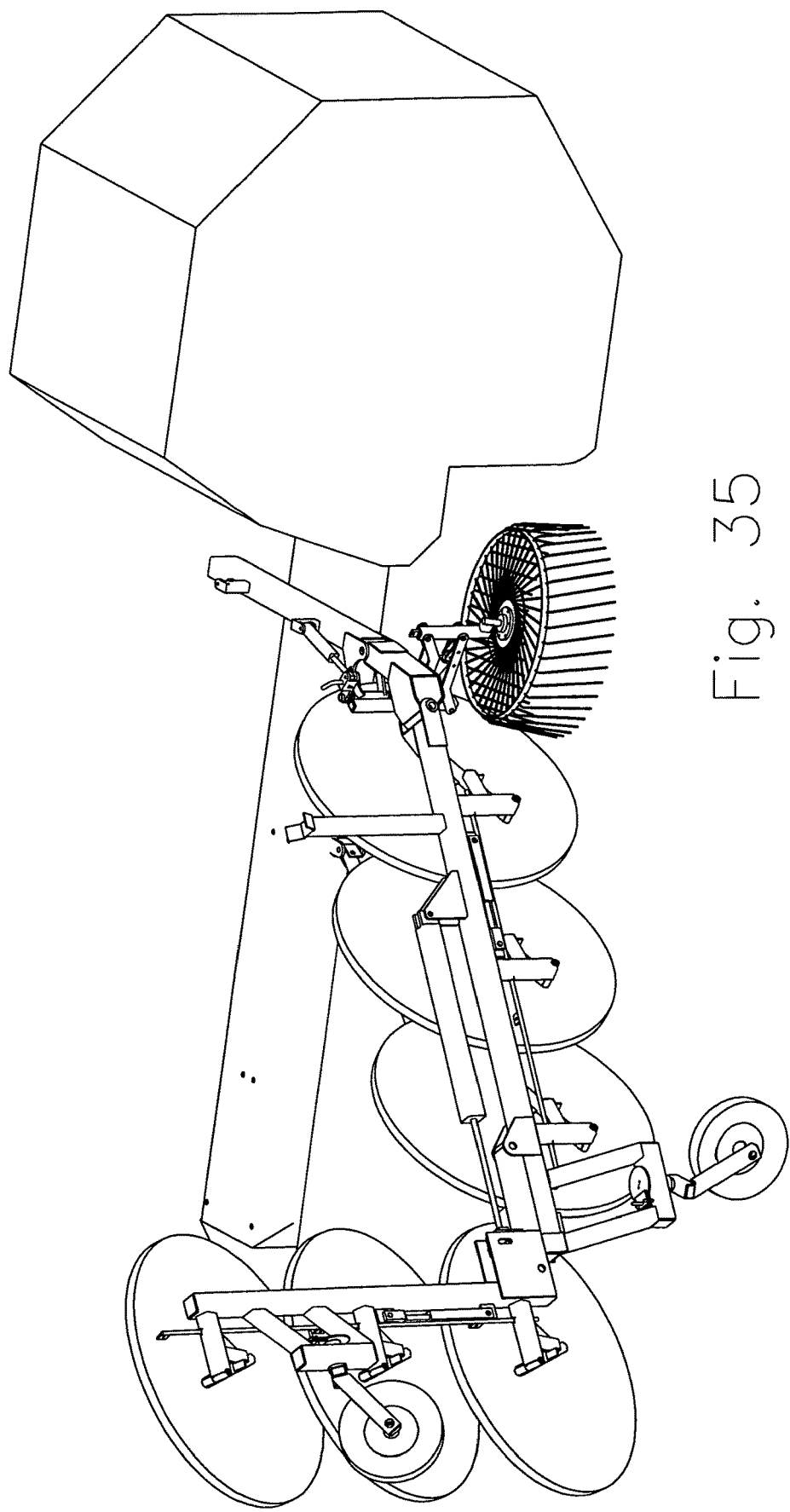
FIG. 35 is a perspective view of the device showing the windrow diverter basket and rake arms with rake wheels and tines with the outer rake arm and rake wheels folding upward to a 90 degree angle to collapse the rake for transport.
Figure 36:
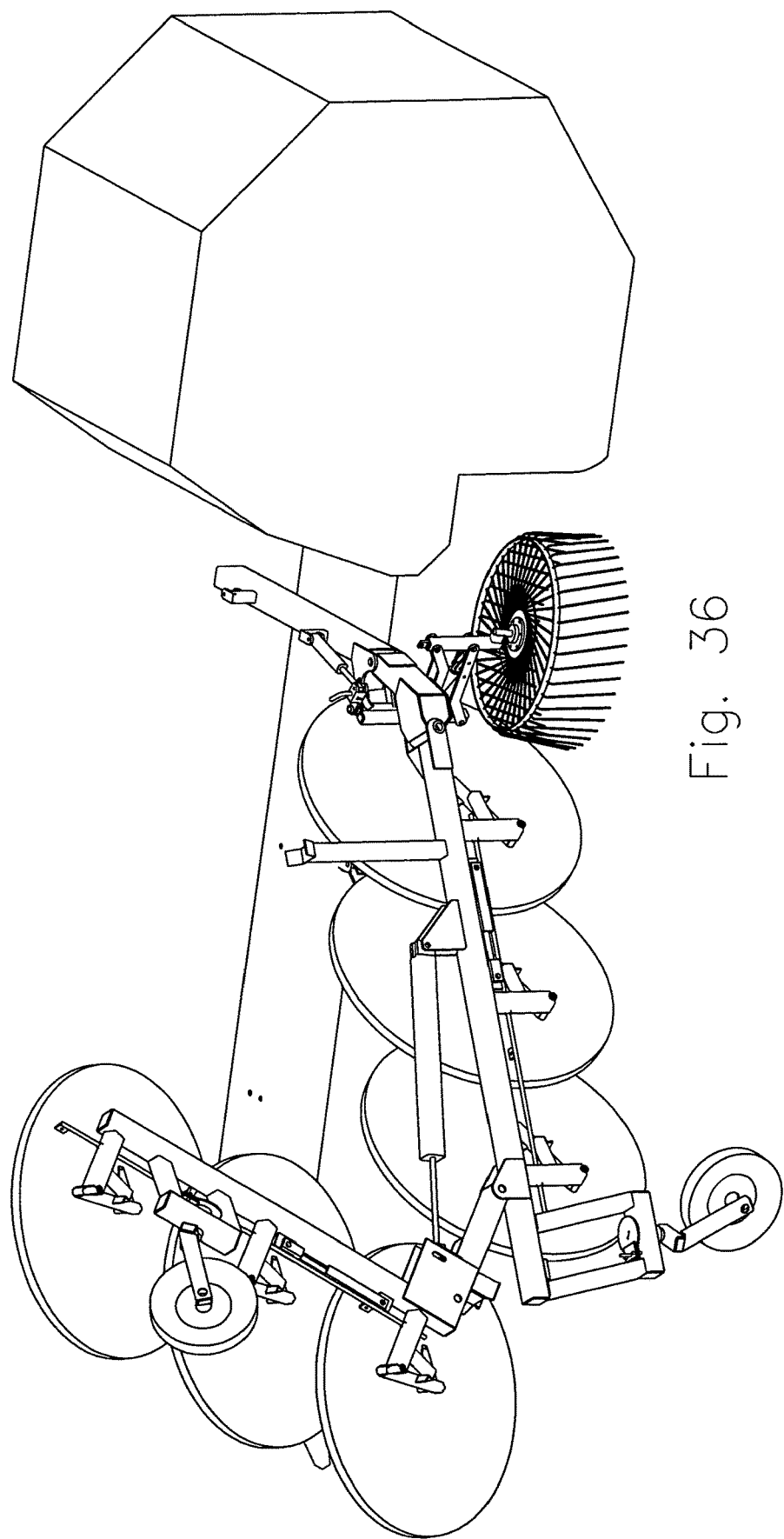
FIG. 36 is a perspective view of the device showing the windrow diverter basket and rake arms with rake wheels and tines with the outer rake arm and rake wheels folding upward and over 180 degrees to collapse the outer rake arms over the inner rake arms for transport.
Figure 37:
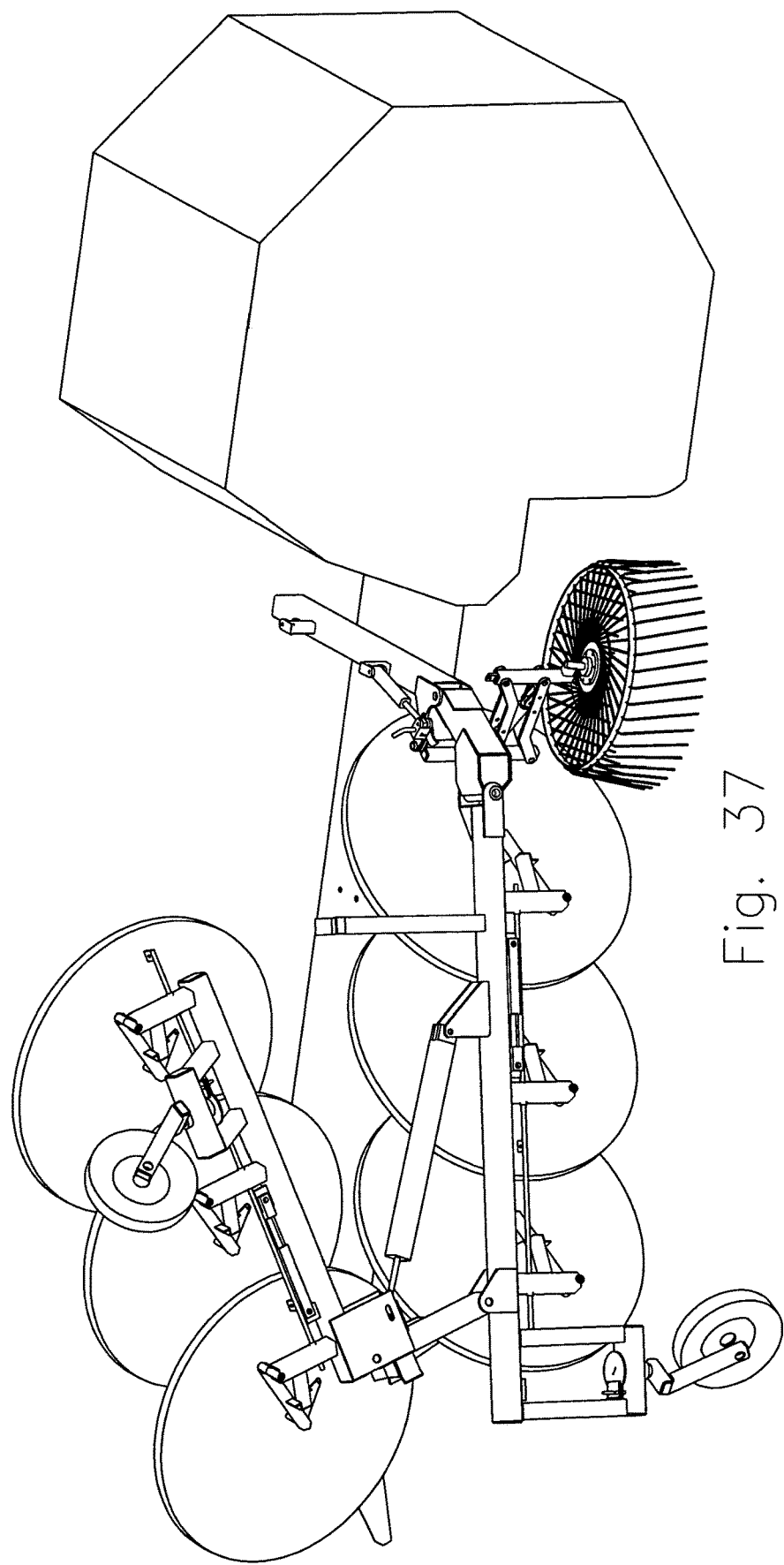
FIG. 37 is a perspective view of the device showing the windrow diverter basket and rake arms with rake wheels and tines with the outer rake arm and rake wheels folding upward and over 180 degrees to collapse the outer rake arms over the inner rake arms and the inner rake arm and rake wheels being pulled inwardly toward the draw bar for transport.
Figure 38:
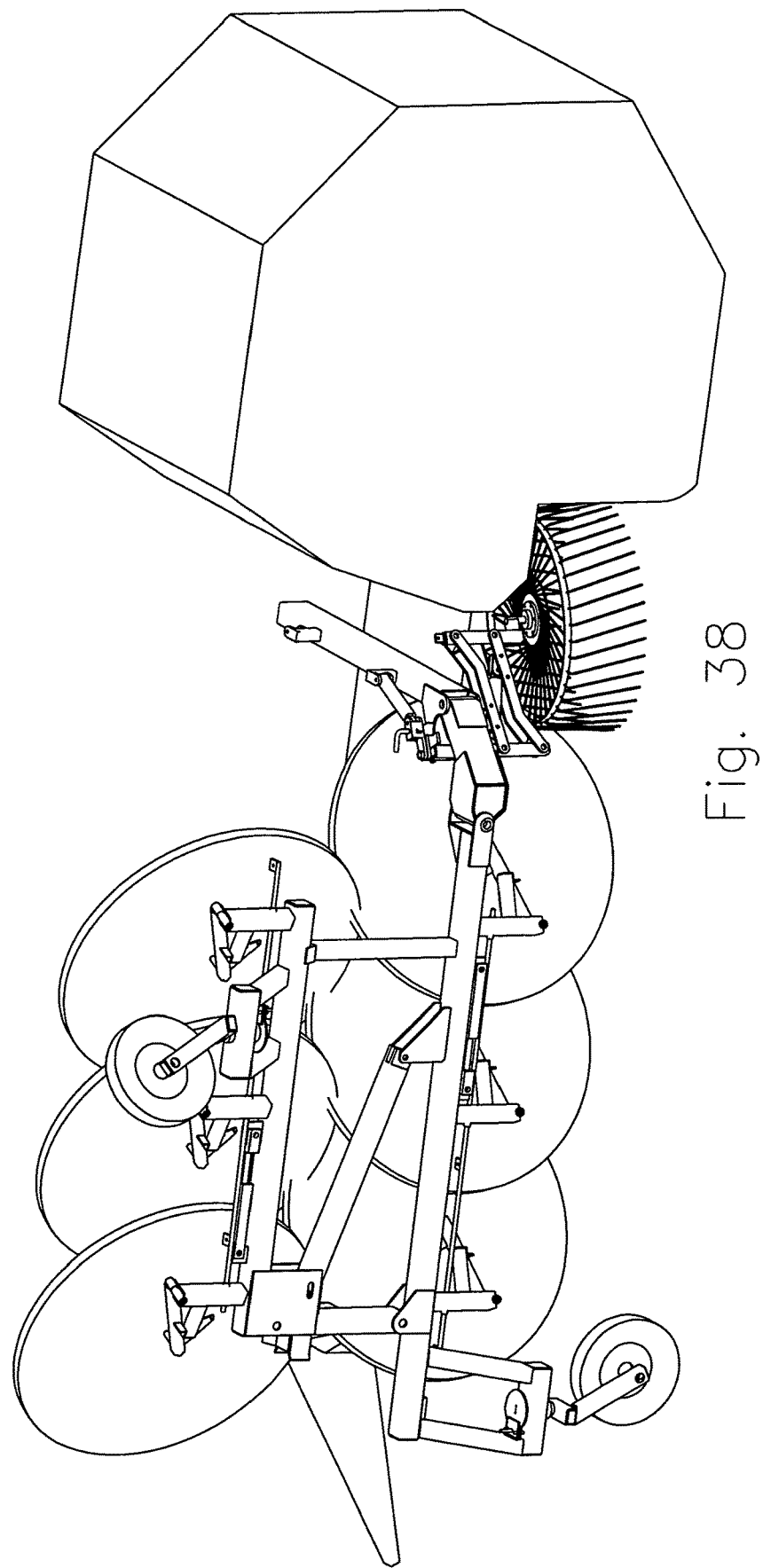
FIG. 38 is a perspective view showing the baskets of the windrow diverter and arms of the rake pulled inwardly toward the draw bar with the outer rake arms folding on top of the inner rake arms which are folded inwardly toward the draw bar in transport position.
Figure 39:
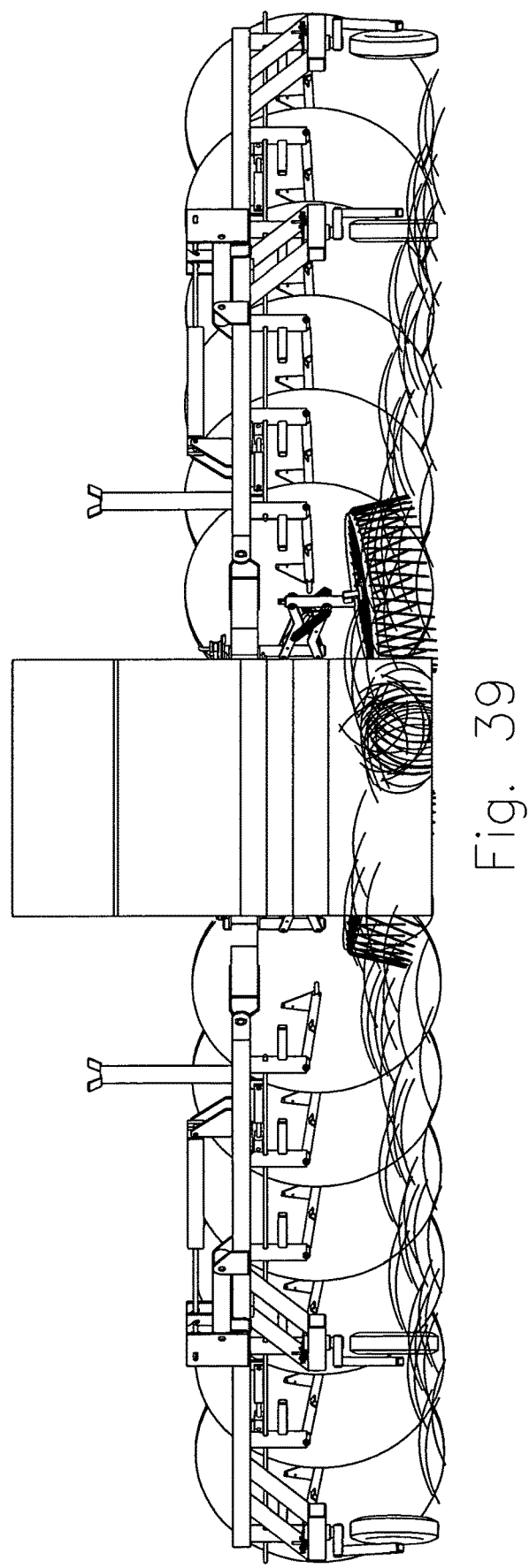
FIG. 39 is a rear cutaway view of the rake, windrow diverter, and hay baler, showing hay raked into a windrow by the rake and the diverter basket diverting the hay windrow to the right side of the hay baler.
Figure 40:
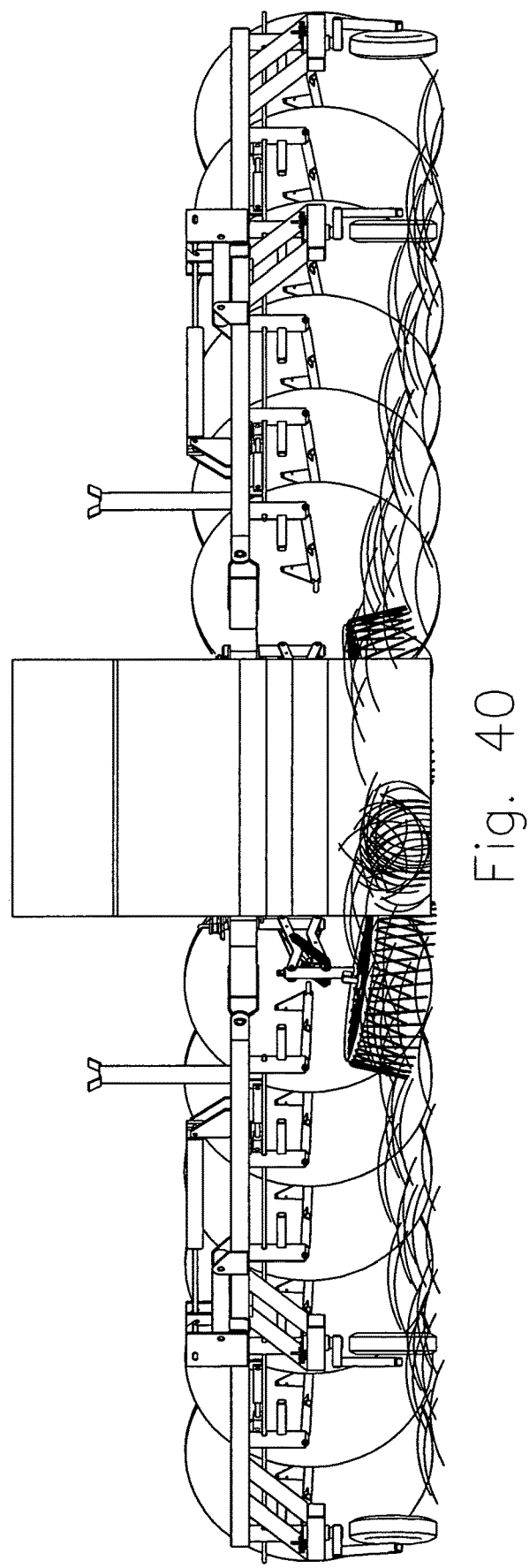
FIG. 40 is a rear cutaway view of the rake, windrow diverter, and hay baler, showing hay raked into a windrow by the rake and the diverter basket diverting the hay windrow to the left side of the hay baler.
Figure 41:
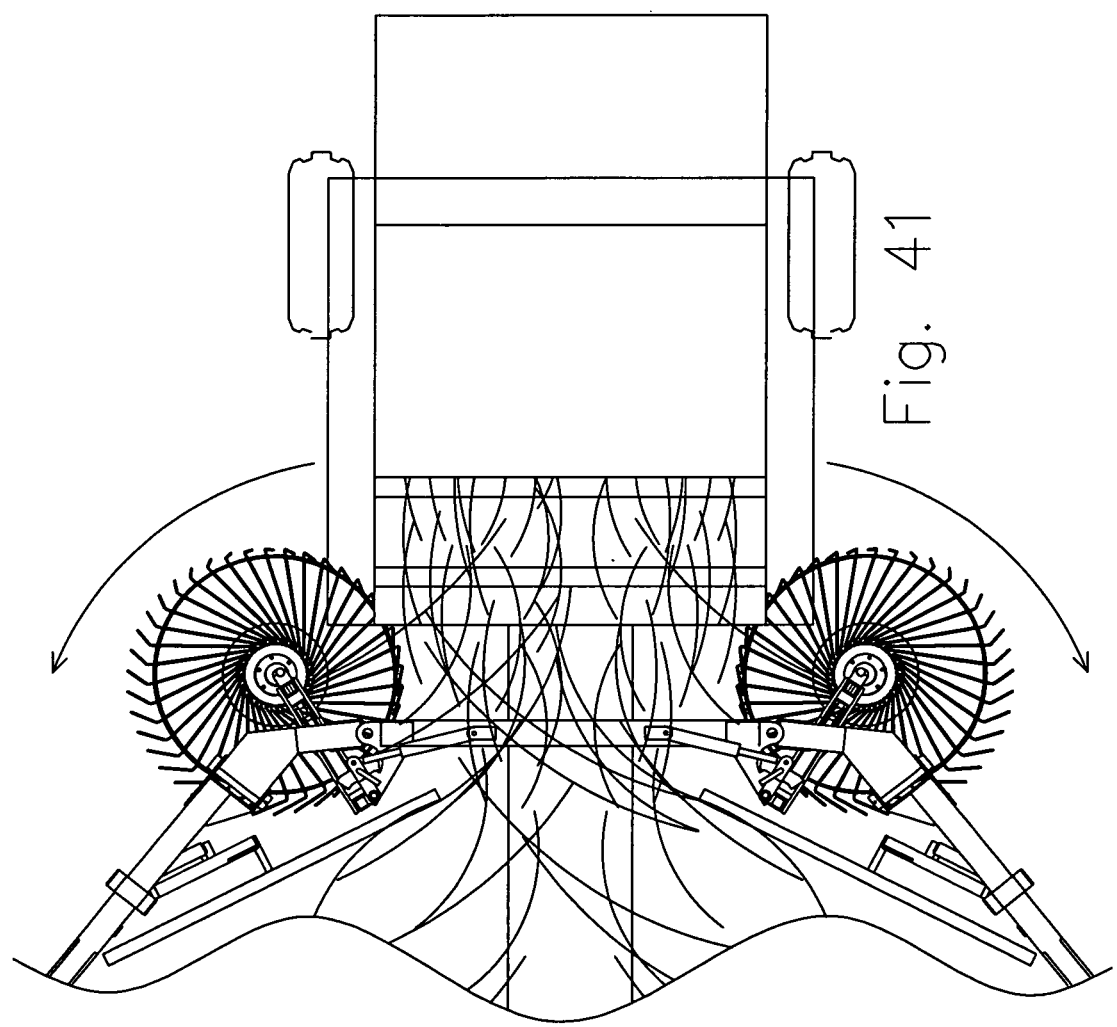
FIG. 41 is a top view showing the windrow diverters lifted upward and positioned outside of the hay baler pickup when the hay bale roll in the baler is of equally proportioned in diameter and the diverters are not necessary to move the windrow to a particular path to form an uniform diameter bale.
Figure 42:
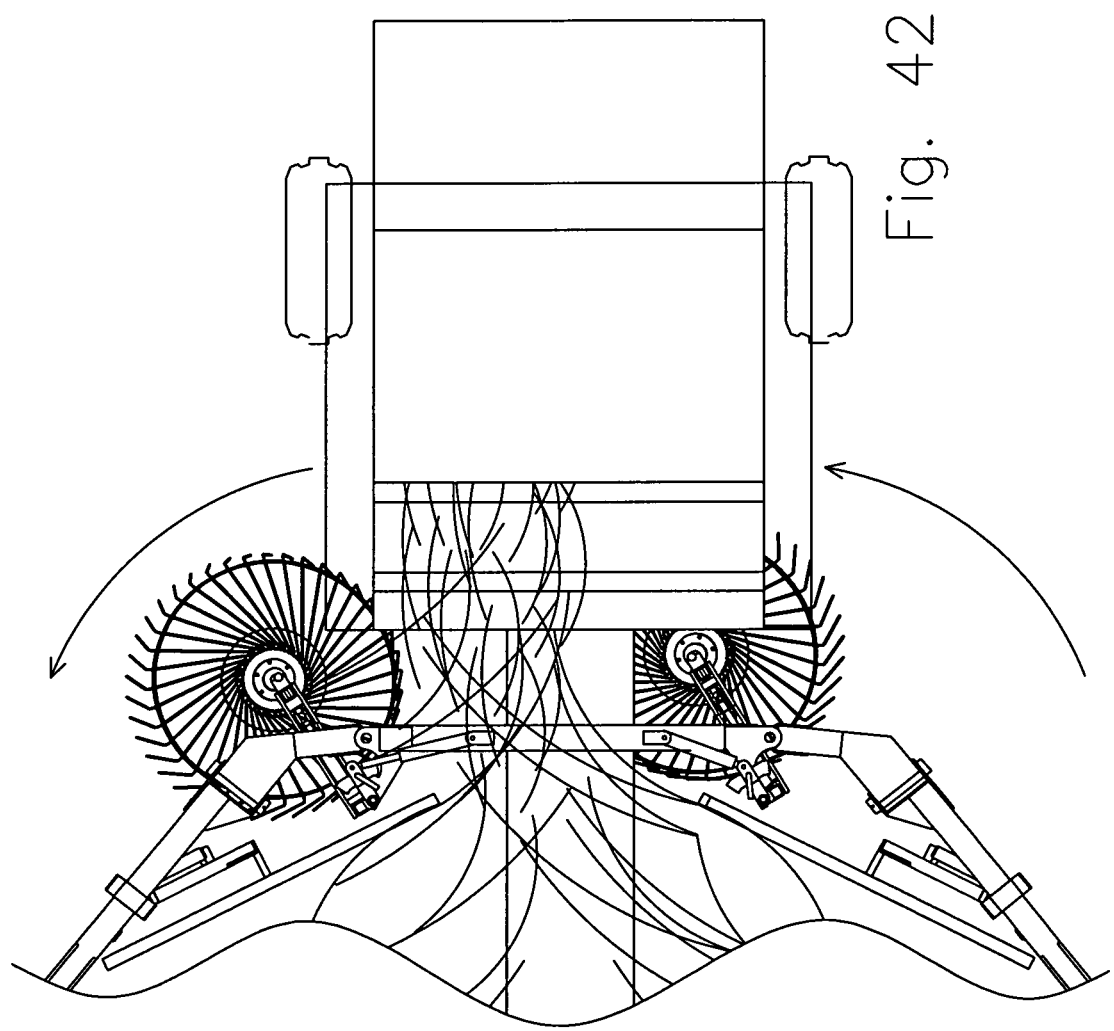
FIG. 42 is a top view showing the windrow diverter on the left lowered into the operating positioning to move hay to the right side of the baler pickup when the diameter of the hay bale is smaller and needs more hay on the right side of the bale.
Figure 43:
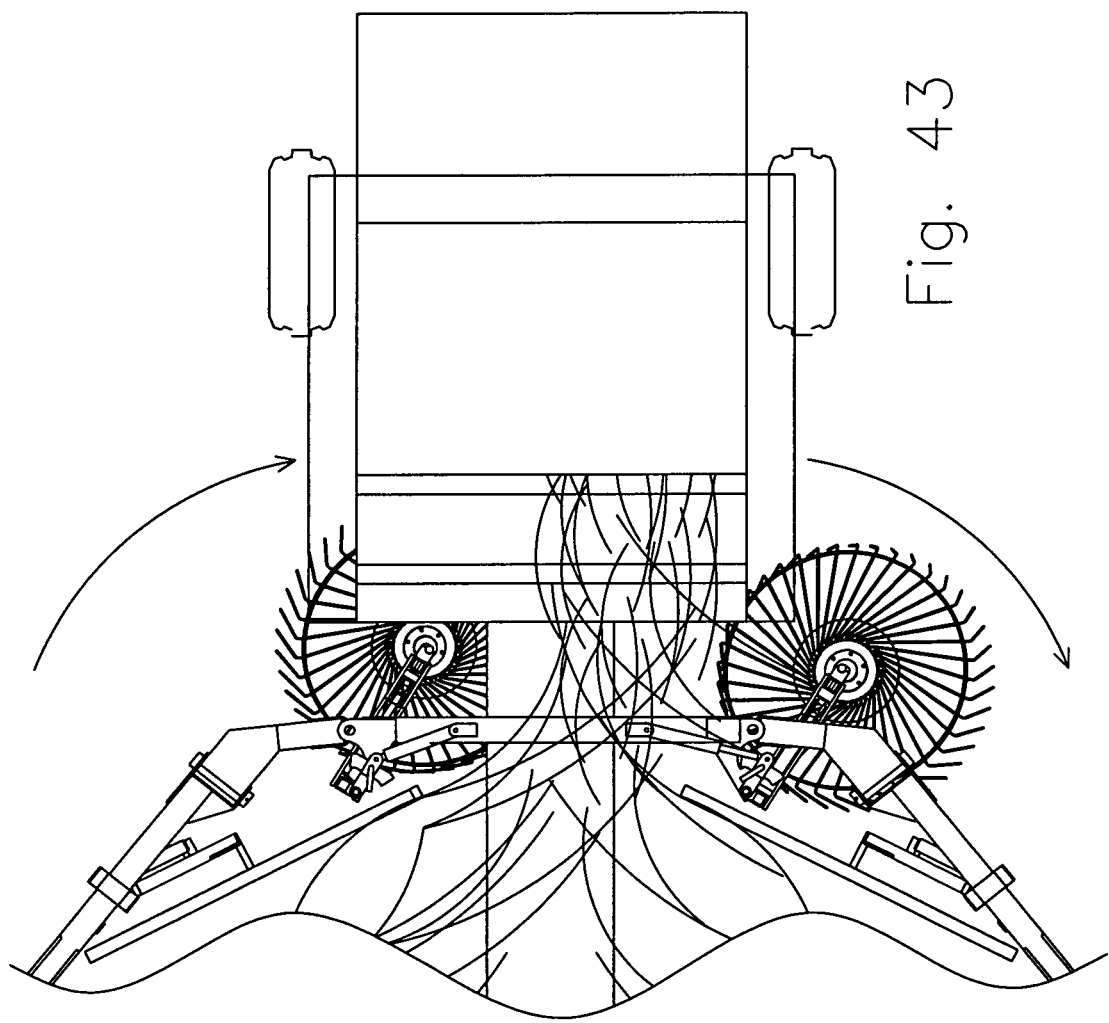
FIG. 43 is a top view showing the windrow diverter on the right lowered into the operating positioning to move hay to the left side of the baler pickup when the diameter of the hay bale is smaller and needs more hay on the left side of the bale.
Figure 44:
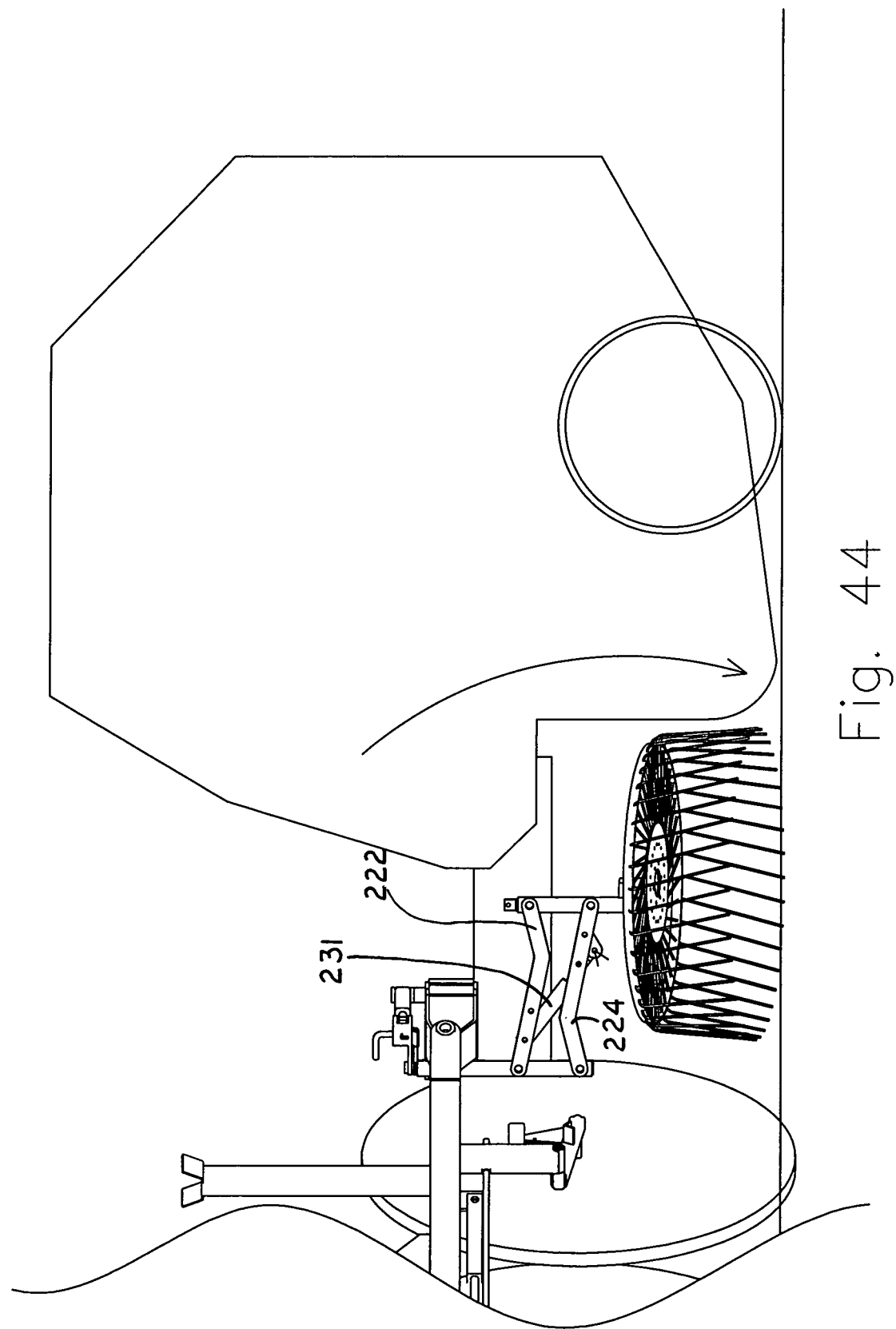
FIG. 44 is a side view showing the windrow diverter lowered to the in-use position on the ground and shows the extra link in the support frame allows the basket to float over the contour of the ground.
Figure 45:
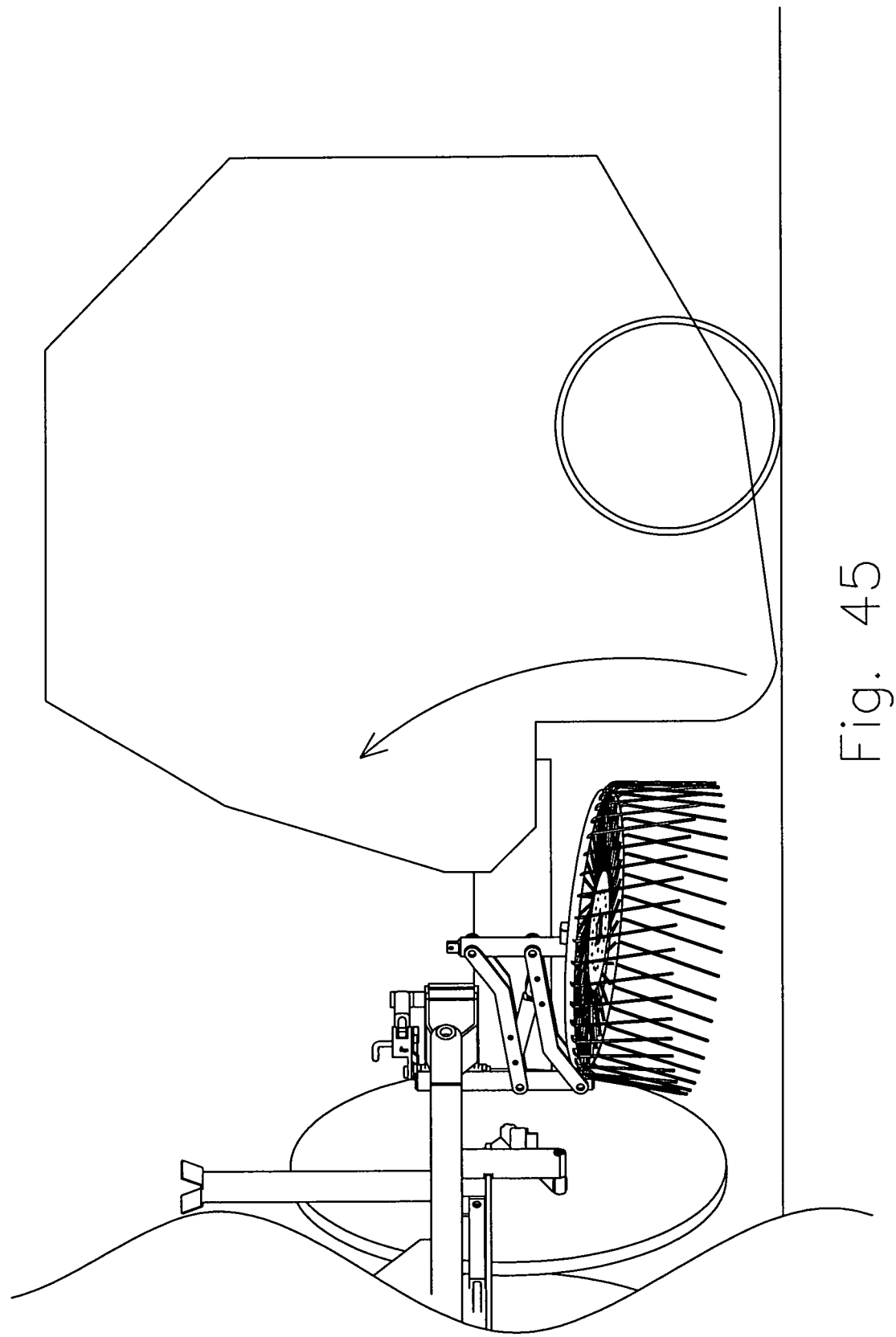
FIG. 45 is a side view showing the windrow diverter raised upward to a travel position.
Figure 46:
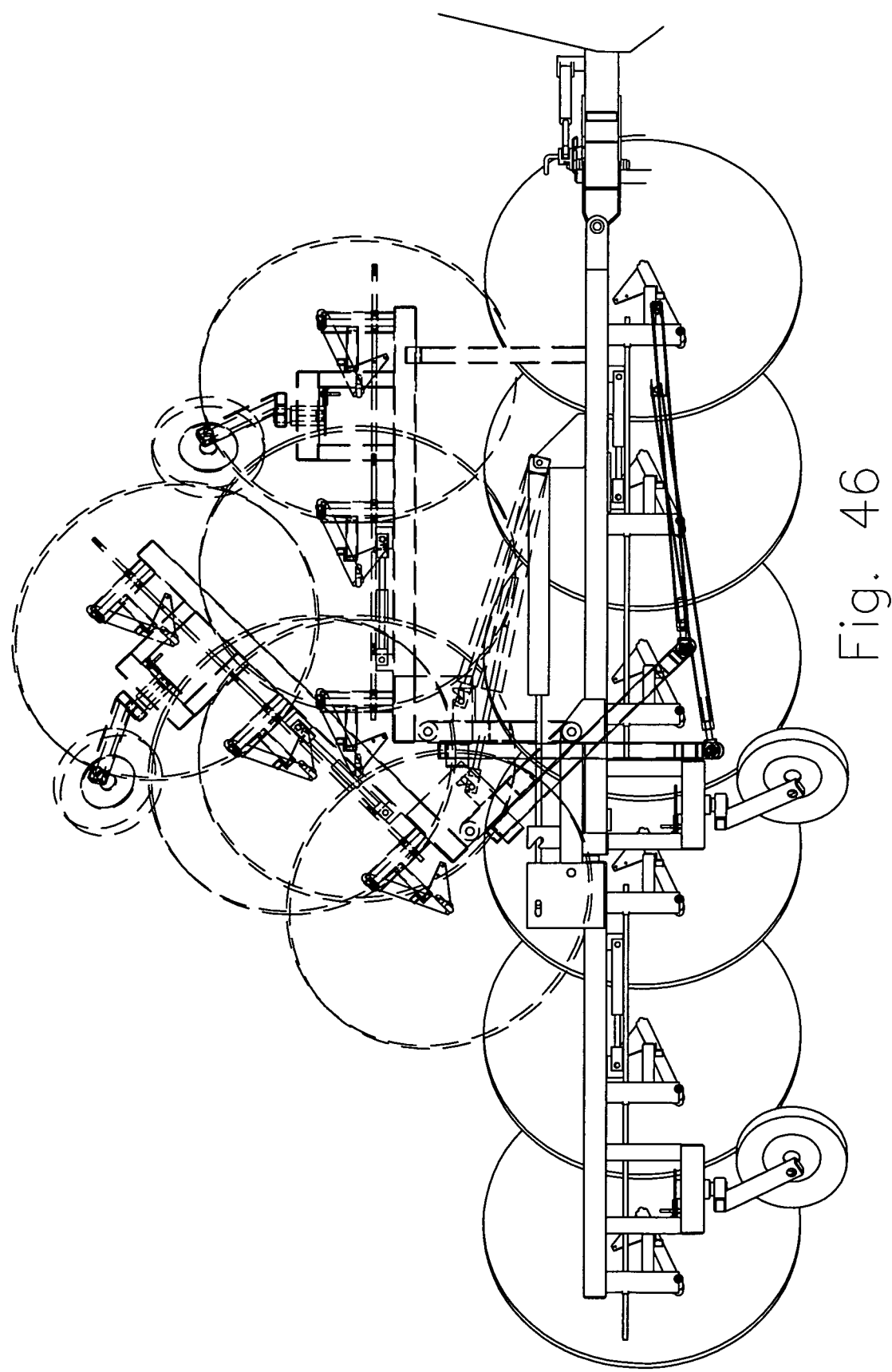
FIG. 46 is a perspective view showing the rake arm and rake wheels in the expanded in use field position and showing the wheels and rake arms in broken lines in the folding positions.
Figure 47:
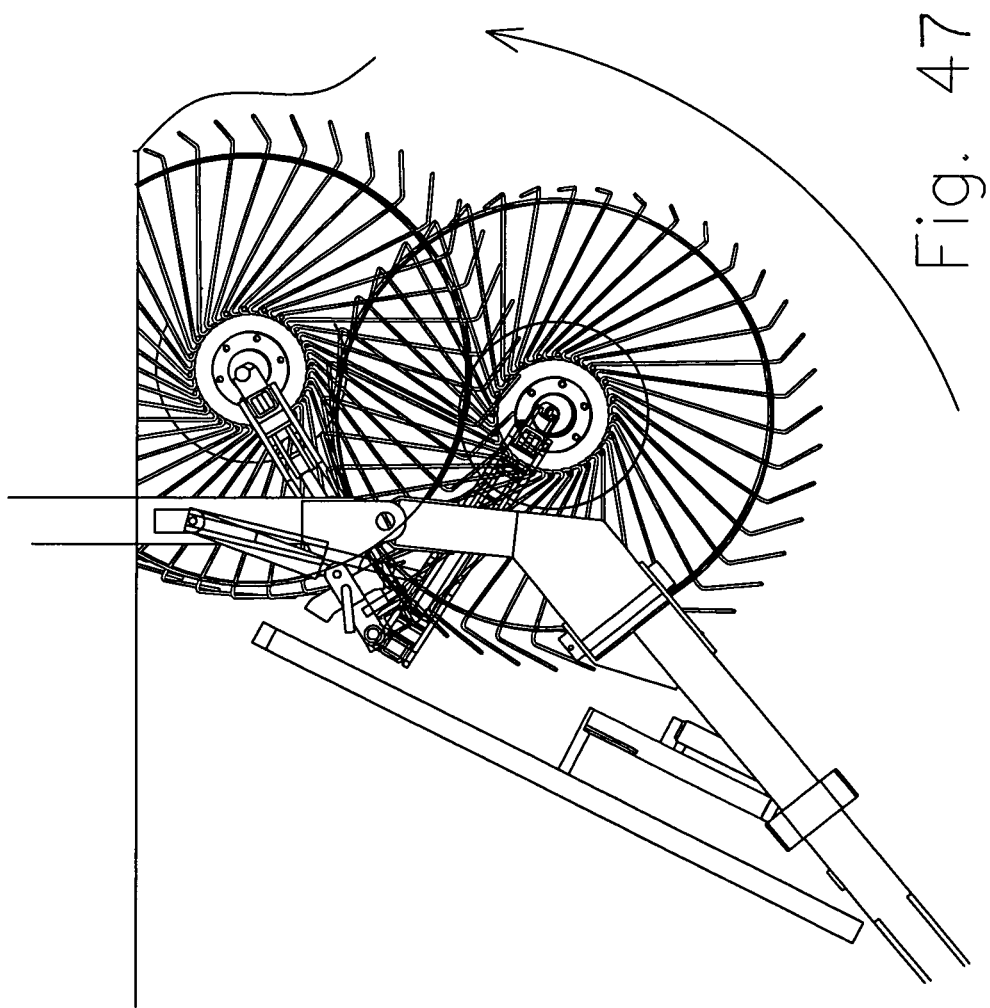
FIG. 47 is a top view showing that each diverter works relative to the other, the active basket will not extend until the other is retracted completely.
Figure 48:
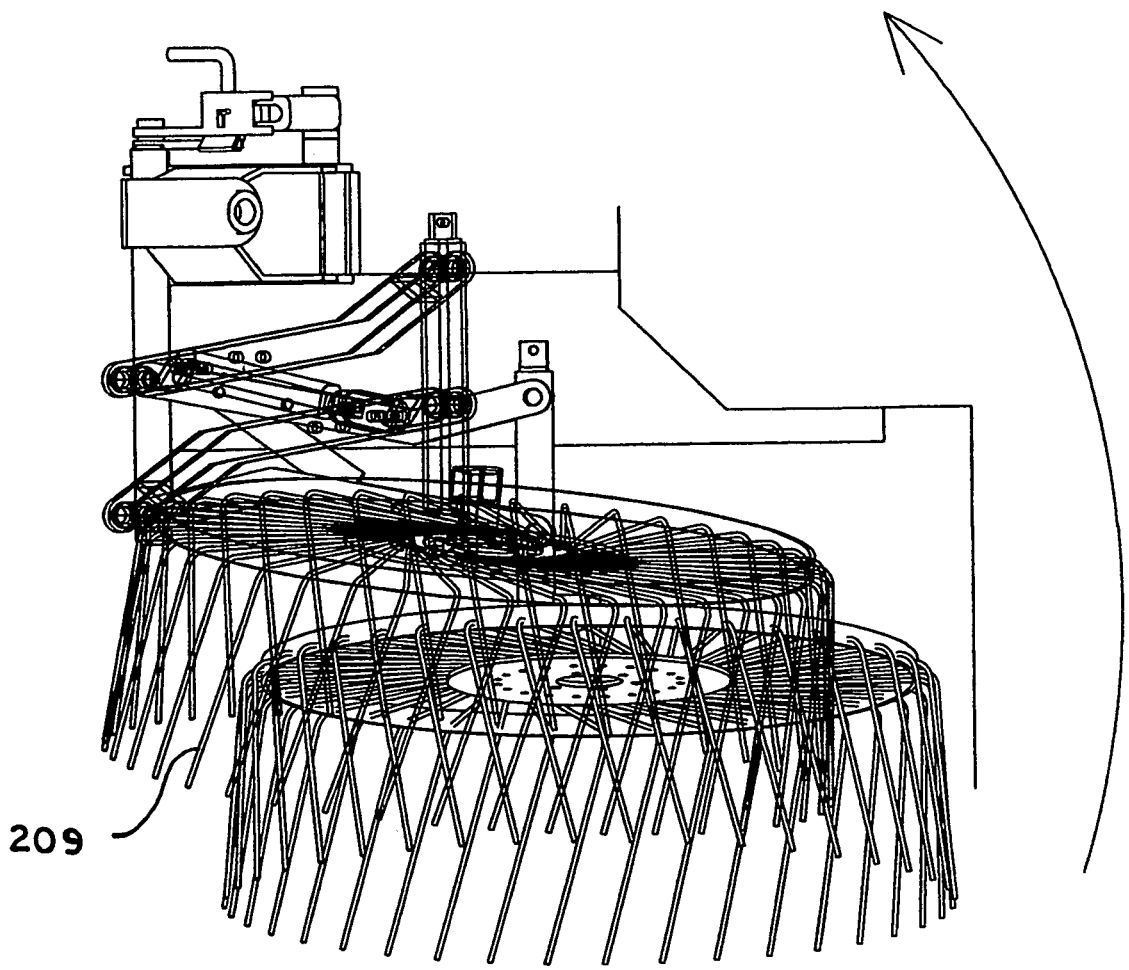
FIG. 48 is a perspective view showing that when each diverter basket is lowered to the ground and the basket is in use the extra link in the diverter frame allows the basket to float with the contour of the ground.

FIG. 1 illustrates a roll type baler 10 towed by a tractor 20 via an elongate draw bar assembly 30. The draw bar maybe an assemblage or weldment of members suitably designed for the task taking into account strength and weigh considerations. The draw bar is connected to the baler as diagrammatically illustrated at 31 in FIGS. 1 and 12.

The baler 10 is conventional having a pick-up 11 that picks up a windrow on the ground and feeds it to a roll forming cavity located within the baler. Mounted on the draw bar is a wide sweep rake 100, provided in accordance with one aspect of the present invention, followed by a windrow crowder and diverter 200 provided in accordance with another aspect of the present invention.

The windrow crowder and diverter 200, described in detail hereinafter, shifts one or the other or both of the marginal edges of the windrow laterally relative to the intake of the baler during baling or can remain idle in instances where the width of the windrow corresponds in width to that of the baler pickup. Shifting the swath marginal edge portions makes the windrow narrower so as to correspond in width to the width of the baler pick-up and allows positioning the rake swing arms further apart from one another and thus sweep a wider area than otherwise would be possible.

The windrow crowder is controllably movable to make the windrow width up to for example 50% narrower than that of the baler pick-up and to divert that narrower windrow to different positions laterally across the width of the baler pick-up. This allows the operator to direct the material being picked up toward one edge or the other opposite edge of the bale or positions there between as, where or when needed to form a suitable bale.

The rake, mounted on the draw bar, sweeps an area of selected width (for example 27 feet-three 9 foot swath cuts) moving the cut material lying on the ground in that area into a windrow having a selected width that if desired can be wider or essentially equal in width with the baler pick-up and in alignment therewith. The crowder can be used to reduce the width of the windrow to match that of the baler pickup.

The rake 100 includes respective first and second articulated swing arms 101, 102 connected by respective ones of a pair of link members 103 to respective opposite ends of a cross bar 104 securely fixed to the draw bar 30 and located at a position forward of the pickup. Each link 103 is connected to the cross bar 104 by a pivot pin 105 having a vertical pivot axis and to the swing arm associated therewith by pivot pin 106 having a horizontal pivot axis. The pivotal connection provided by pin 105 allows the sweep arm to swing toward and away from the draw bar and pin 106 allows the arm to be swung upwardly to a rake storage or travel ready position.

The sweep arms 101, 102 diverge outwardly from one another in a direction generally toward the tractor and are located respectively on opposite sides of the draw bar 30. The free forward outer leading ends of the rake sweep arms are moveable via respective ones of a pair of power units 108, 109 in directions toward and away from the draw bar. Each power unit comprises an extendible and retractable hydraulic (or if desired pneumatic) cylinder unit (or equivalents thereof) connected at opposite ends thereof respectively to the draw bar 30 and the rake swing arm associated therewith.

Figure 3:
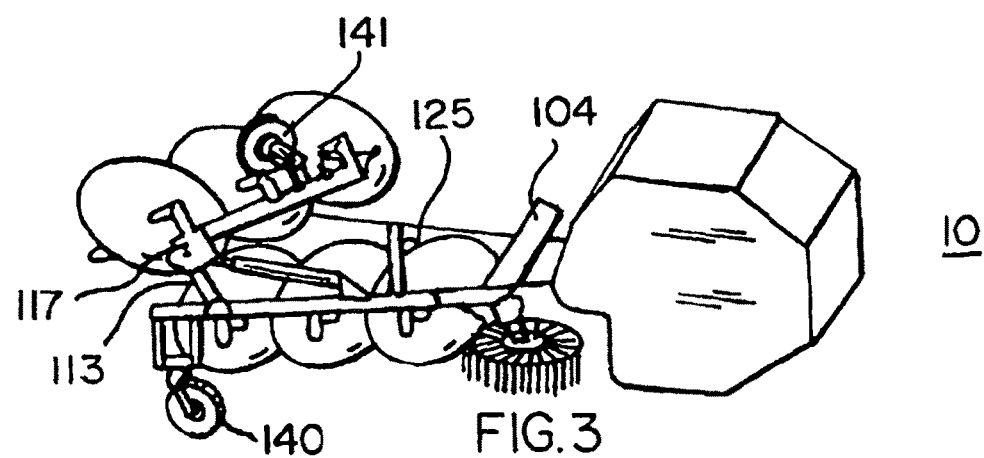
FIG. 3 is a diagrammatic oblique view illustrating one of the articulated rake arms in one position during folding of the same to an inoperative travel ready position.
Figure 4:
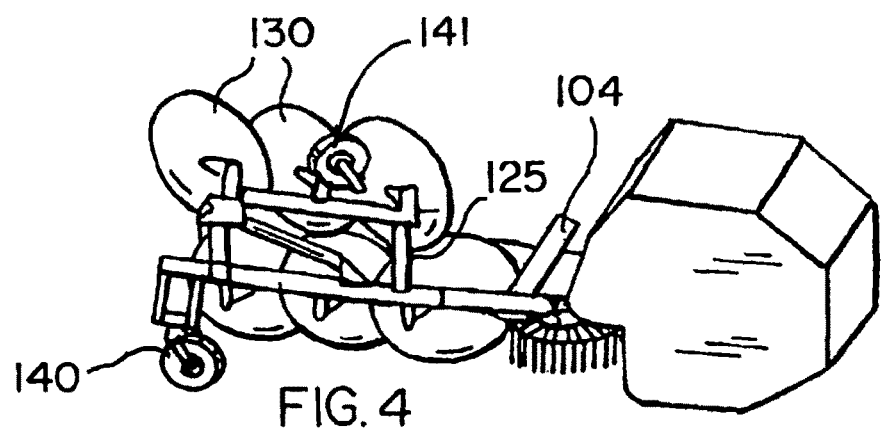
FIG. 4 is similar to FIG. 3 illustrating the same rake arm in a completely folded and retracted position assumed in a rake storage and travel ready position.
Figure 5:
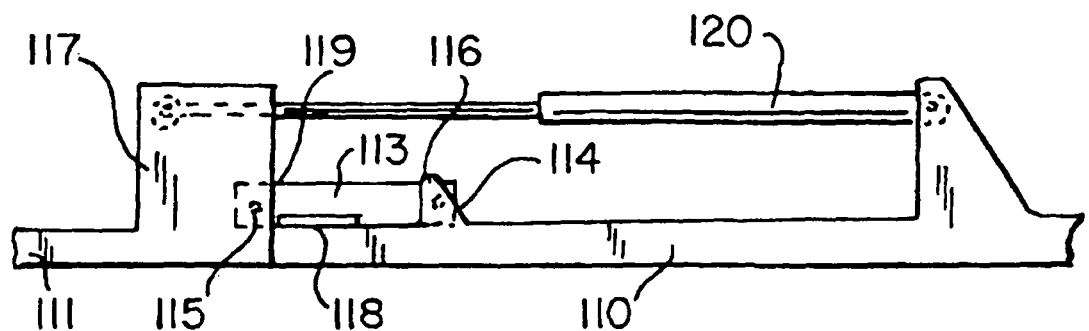
FIG. 5 is a side elevation view of a portion of one of the pari of articulated rake arms illustrating a relative position of the members of the arm in a rake operating position.
Figure 6:
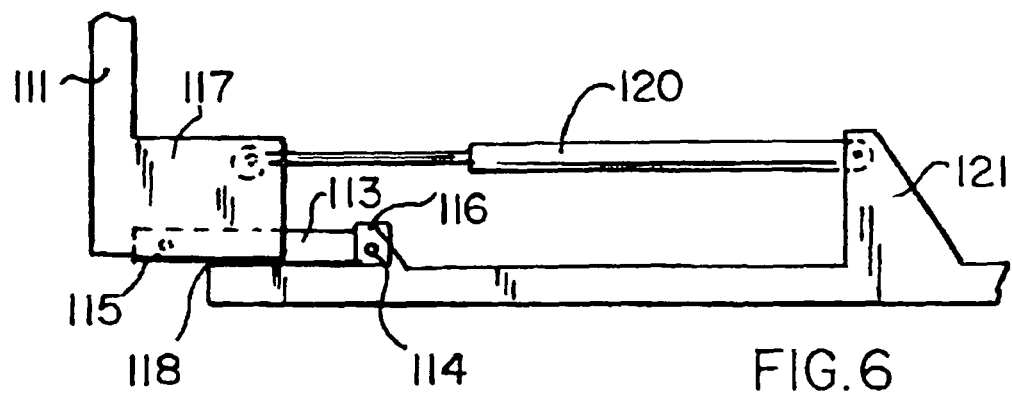
FIG. 6 is a side elevation view of a portion of one of the pari of articulated rake arms illustrating a relative position of the members of the arm in folded to a rake storage and travel ready position.
Figure 7:
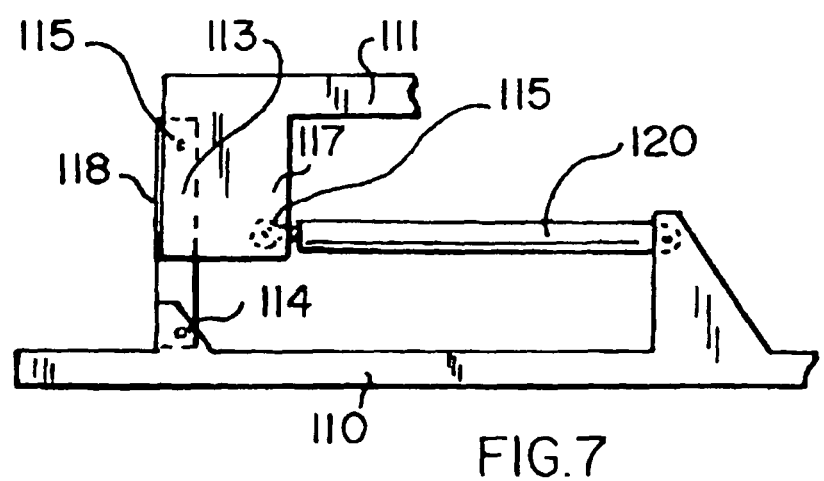
FIG. 7 is a side elevation view of a portion of one of the pari of articulated rake arms illustrating a relative position of the members of the arm in when the rake arm is midway between the two positions shown in FIGS. 5 and 6.
Figure 8:
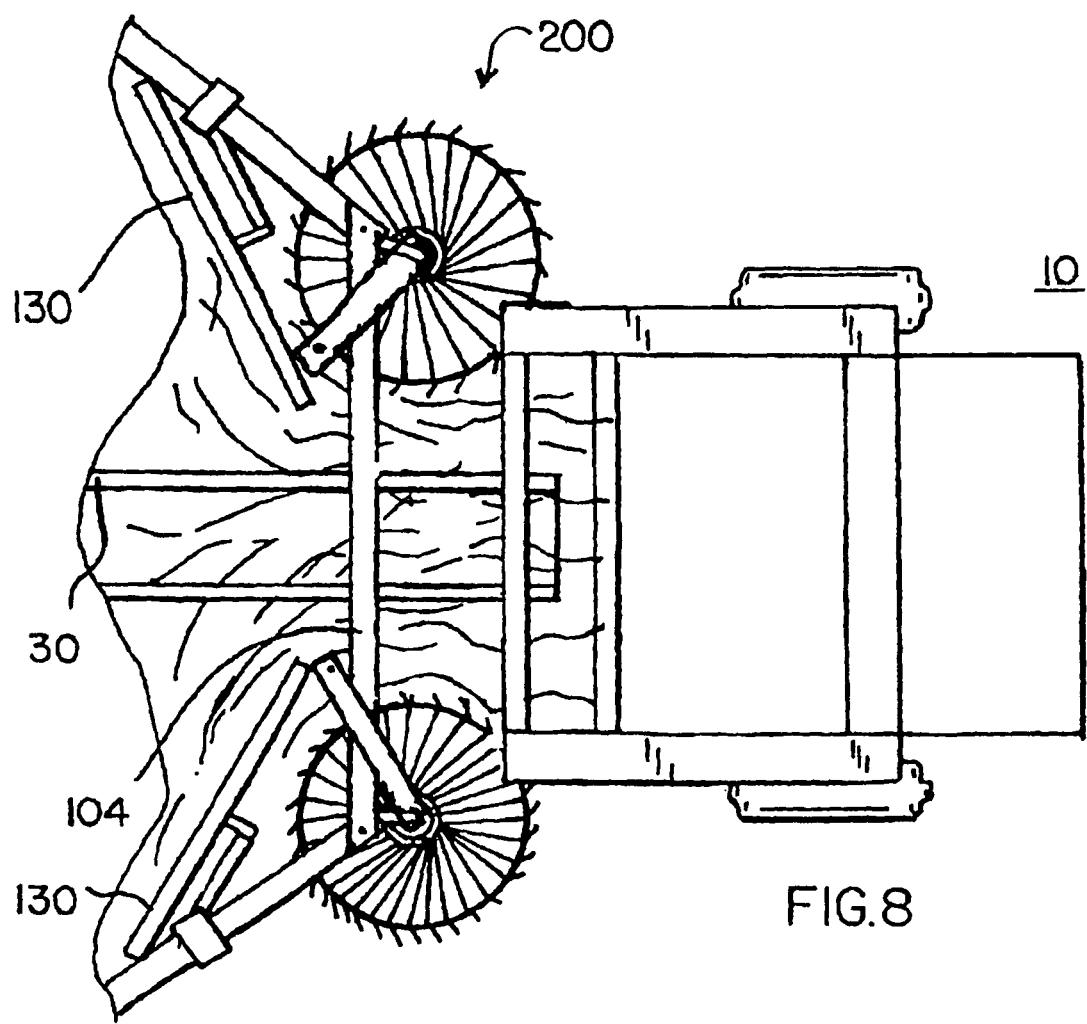
FIG. 8 is a top view showing the windrow diverting mechanism diverting each of the marginal edge portions of the windrow so that the width of the windrow corresponds essentially to the width of baler pick-up.
Figure 9:
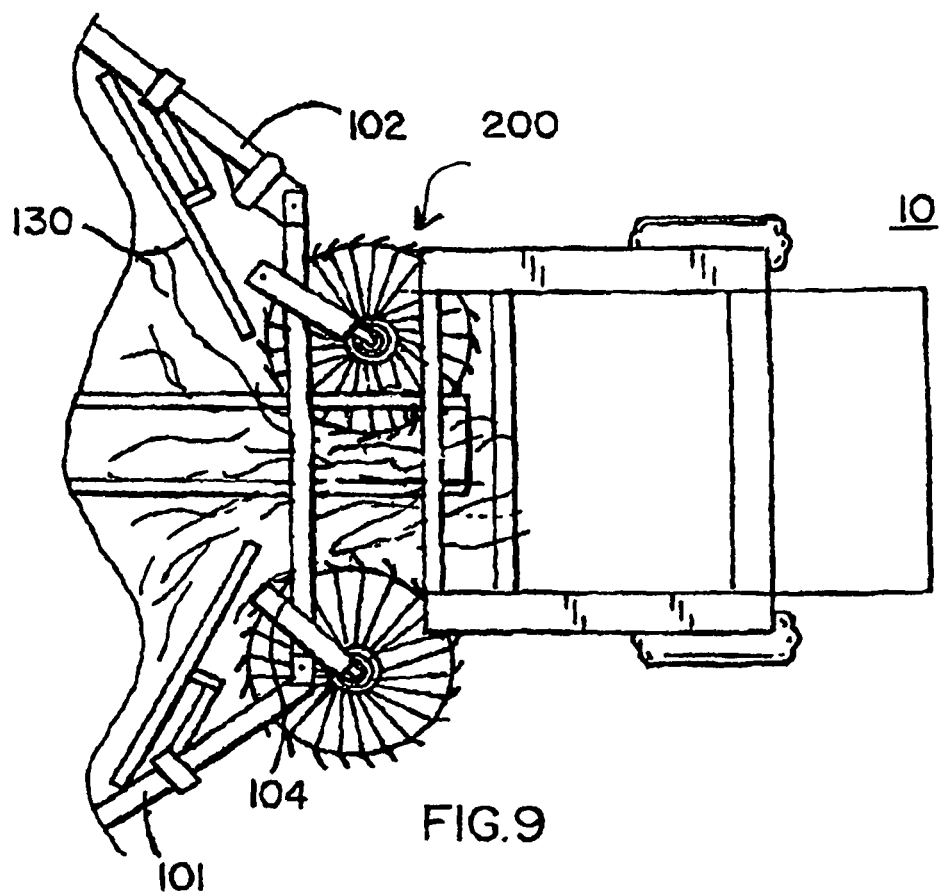
FIG. 9 is a top view showing the windrow diverting mechanism diverting the windrow toward the left side of the baler pickup toward one edge of the bale.
Figure 10:
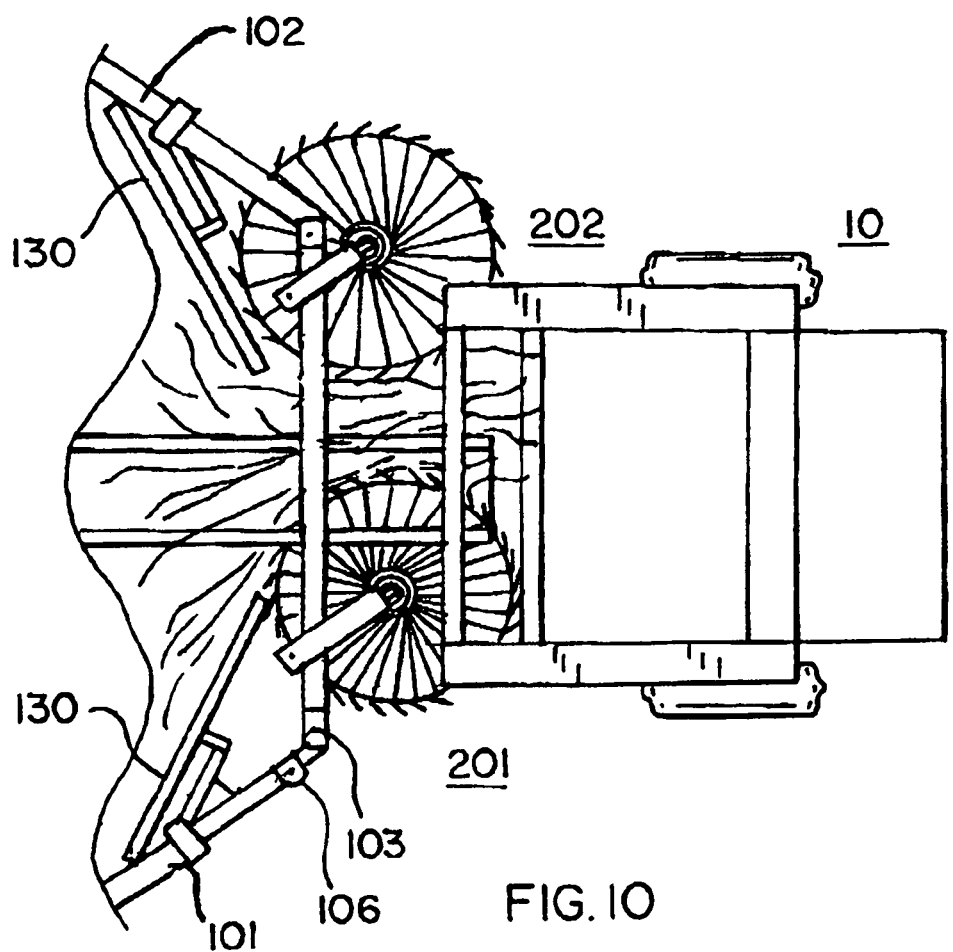
FIG. 10 is a top view showing the windrow diverting mechanism diverting each of the windrows so that the width thereof is less than the width of the bale being formed.
Figure 11:
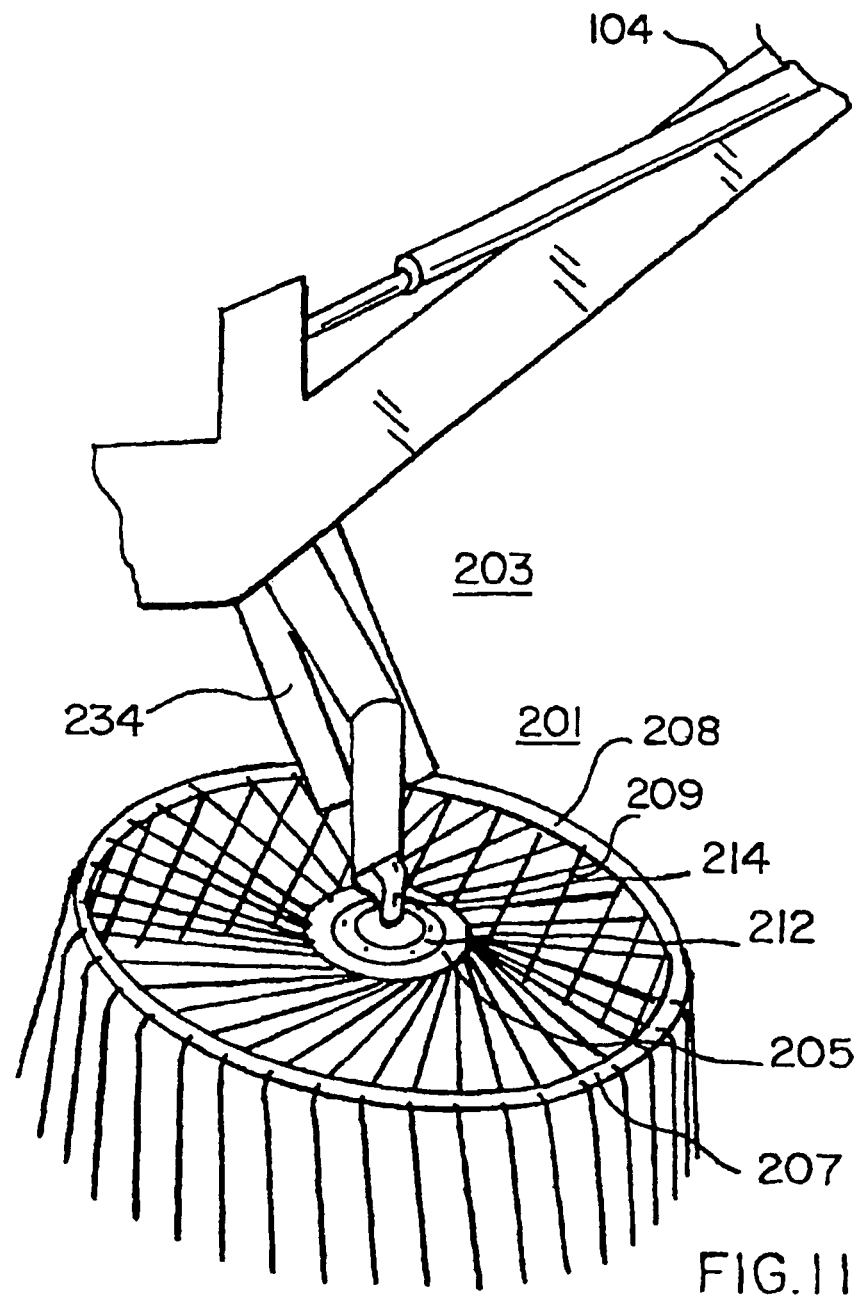
FIG. 11 is an oblique view, on a somewhat larger scale, of one of the pair of windrow lateral diverting mechanisms.

Each articulated arm 101, 102 comprises first and second rigid arm sections 110, 111 interconnected by hinge means 112. The hinge means 112 (see FIGS. 5-7) comprises a link 113 pivotally connected proximate respective opposite ends thereof via respective pivot pins 114, 115 to lugs 116, 117 secured to and projecting from respective arm sections 110, 111. The link 113 has an abutment plate 118 projecting laterally therefrom and located for engagement with an edge portion 119 of the lug 117 on the arm section 111. The arm sections 110, 111 as shown in FIG. 5 are disposed end-to-end in a rake operative position (FIG. 1) and are movable therefrom to the position shown in FIG. 7 where they are generally parallel to and offset from one another in a rake travel ready position (FIG. 4). FIG. 6 illustrates an intermediate position to that shown in FIGS. 5 and 7 where pivoting about pin 115 has brought the lug edge 119 into engagement with the abutment plate 118 by retraction of an extendable and retractable power unit 120 connected at opposite ends thereof to the lug 117 and a lug 121 on the respective arm sections 111, 110. In this position the rake arm section 111 projects vertically upward and further retraction of the power unit causes pivoting to occur about pivot pin 114 moving the link 113 from it's horizontal position (FIGS. 5, 6) to a vertical position (FIG. 7). The relative position of the rake arm sections shown in FIG. 6 is just prior to that shown in FIG. 3 that illustrates the rake arm being folded upon itself to a rake travel ready position. In this position the rake arm section 111 rests in a cradle on the upper end of a support post 125 secured to and projecting upwardly from the rake arm section 110.

Each rake arm section has a plurality of tined raking wheels 130 rotatably mounted thereon for rotation about generally horizontally disposed axes. Each rake arm is supported by a caster wheel units 140, 141 attached to and located under respective rake arm sections 110, 111. The unit 140 is located proximate the hinge means 112 interconnecting the arm sections 110, 111 and the other unit 141 is located proximate the free outer end of the arm section 111.

The windrow crowder and diverter 200 comprises a pair of tined units 201, 202 rotatably and swingably mounted by respective ones of a pair of assemblies 203 on the crossbar 104 associated therewith. Each tined unit rotates in a plane inclined at a selected acute angle to the horizontal and is caused to rotate by frictional engagement with the ground during the raking and baling operation, Each unit is a circular basket comprising a hub 205 with a plurality of spokes 206 extending outwardly therefrom and maintained in circumferential spaced apart relation by an annular rim 207 circumscribing and radially spaced from the hub. Each spoke has a first portion 208 that extends from the hub to the rim and a second portion 209 angularly disposed with respect to the first portion and projecting from the rim. The spoke portions 208 are located in a plane disposed generally perpendicular to the axis of rotation of the unit and the continuing second portions 209 define a generally cylindrical or truncated conical open wall whose axis coincides with the axis of rotation of the unit. The spokes pass through a respective one of a plurality of circumferentially spaced apart holes 210 in the rim 207 and are thereby held in spaced apart relation.

The hub 205 is detachably secured to a plate 212 on the end of a shaft 214 that is journalled for rotation proximate the lower end of a post 220 that is part of the aforementioned assembly 203. The assembly 203 has a further post 221 and a pair of an upper and lower spaced apart pair of links 222, 224 interconnecting the posts 220, 221. The links are pivotally connected to the posts by pivot pins 225, 226, 227, 228. Power unit 231 raises tine assembly 201 to a transport level or lowers it to a floating raking level. Tension springs 234 are suitably connected allowing the unit counterbalancing the same so as to float with a selected tined arc portion engaging the ground during raking.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

The invention claimed is:

1. A hay baling assembly towed by a tractor having hydraulic power means, comprising:

an extended elongated draw bar extending to and connecting with a roll baler including a pickup for feeding cut hay into a roll forming cavity located within said roll baler for baling; a windrow diverter assembly mounting on said elongated draw bar in front of said pickup of said roll baler, said windrow diverter assembly including a frame having at least one tined diverter raking wheel rotatably and swingably mounting from said frame, said at least one tined diverter raking wheel detachably attaching to an end of a shaft journalled for rotation extending from a link assembly of said frame comprising an upper link and a lower link pivotally attaching to said frame including a first link assembly hydraulic cylinder extending from a selected attachment positions of said draw bar to said frame for raising and lowering said link assembly and at least one tined diverter raking wheel, said link assembly including at least one tension spring extending from a selected attachment positions of said draw bar connecting to said link assembly providing means for counterbalancing said at least one tined diverter raking wheel, said link assembly enabling said tined diverter raking wheel to float at a raking level with a selected tined arc portion engaging the ground causing rotation of same in a plane inclined at a selected acute angle to the horizontal causing said tined diverter raking wheel to rotate by frictional engagement with the ground, said at least one tined diverter raking wheel assembly including a second hydraulic cylinder in fluid communication with the hydraulic power of the tractor including a first end mounting to an attachment position on a crossbar and a second end connecting to an attachment position on said frame providing lateral movement of said at least one tined diverter raking wheel mounted thereon and controllably movable for shifting a marginal edge of a windrow of hay laterally to a selected position in alignment with said roll baler pickup moving in and back independently diverting said windrow of hay to the side of the roll baler pickup as needed, wherein said at least one tined diverter rake wheel is not fixed and is capable of adjustably moving a windrow from side to side during operation, shifting a marginal edge of a windrow of hay laterally to a selected position in alignment with respect to said roll baler pickup and diverting said windrow to selected different positions aligned laterally across the width of said baler pickup; and a wheel rake including a pair of opposing extendible side arms defining a first side arm and a second side arm having a proximate end pivotally mounted to said elongated draw bar, said first side arm and said second side arm including a plurality of rake wheels, said wheel rake mounting in front of said windrow diverter assembly and behind said tractor, said wheel rake including hydraulic means for positioning said first side arm and said second side arm laterally in an open in-use position and retracting said first side arm and said second side arm in a closed retracted position parallel to said elongated draw bar.

2. The hay baling assembly of claim 1 wherein said hydraulic means for positioning said pair of opposing extendible side arms comprise a pair of hydraulic cylinders mounted on said elongated draw bar in cooperative engagement with said pair of opposing extendible side arms of said rake.

3. The hay baling assembly of claim 1, wherein said first side arm and said second side arm each comprise a first proximate collapsible and extendible side arm pivotally connecting to a second distal collapsible and extendible side arm including hydraulic power unit means in fluid communication with said tractor for extending and retracting said second distal collapsible and extendible side arm upward and over said first proximate collapsible and extendable side arm in a storage and transport position.

4. The hay baling assembly of claim 1, wherein said link assembly including a diagonal link connecting said link assembly to said link assembly hydraulic cylinder.

5. The hay baling assembly of claim 1, wherein said tined diverter raking wheel comprises a central hub and an annular circular rim circumscribing said central hub disposed in selected spaced relation with respect thereto, and a plurality of spokes anchored to said central hub having a first portion extending outwardly to said annular circular rim and means retaining said plurality of spokes in selected spaced relation with respect to one another circumferentially around said annular circular rim, and at least selected ones of said plurality of spokes having a second portion extending beyond said annular circular rim with, said second portion being disposed at a selected angle to said first portion.

6. A hay baling assembly, comprising:
a tractor providing towing and a hydraulic power;
an elongated draw bar rigidly and permanently extending from a roll baler to said tractor;
said roll baler including a pickup for feeding cut hay into said roll baler for baling;
a sweep rake mounted on said elongated draw bar before said roll baler, said sweep rake including a first and a second articulated swing arm pivotally connecting to said elongated draw bar operable by at least one hydraulic cylinder connecting each said swing arm to said draw bar and in fluid communication with said hydraulic power of said tractor, said first and said second articulated swing arms diverging outwardly from a contracted transport position adjacent said elongated draw bar in an outwardly direction generally opposite from one another at a selected angle and distance in an extended position, each of said swing arms including a plurality of tined sweep raking wheels rotatably mounting on said swing arms at a selected acute angle to the ground surface, and each swing arm including at least one caster wheel unit for supporting said swing arm while in said extended position; and a windrow crowder and diverter assembly including a frame mounting on said elongated draw bar behind said sweep rake and in front of said roll baler pickup, said windrow crowder and diverter assembly including at least one tined diverter raking wheel rotatably and swingably mounting therefrom and extending from said frame at a selected angle and engageable with the ground causing rotation thereof toward said roll baler pickup, said windrow crowder and diverter assembly including means of counterbalancing said tined diverter raking wheel enabling same to float with a selected tined arc portion engaging the ground during rotation, said windrow crowder and diverter assembly including at least one hydraulic cylinder in fluid communication with said hydraulic power of said tractor and controllably movable to laterally move said tined diverter raking wheel in cooperative engagement with a hay windrow shifting a marginal edge of said hay windrow laterally to a selectable position aligned with respect to said roll baler pickup diverting said windrow to selected different positions laterally across a selected width of said roll baler pickup as needed for evenly distributing the windrow across the width of said roll baler pickup during initial formation of a roll relative to an intake of said roll baler pickup moving in and back independently diverting said windrow of hay to the side of roll baler pickup as needed, wherein said at least one tined diverter rake wheel is not fixed and is capable of adjustably moving a windrow from side to side during operation, shifting a marginal edge of a windrow of hay laterally to a selected position in alignment with respect to said roll baler pickup and diverting said windrow to selected different positions aligned laterally across the width of said roll baler pickup.

7. The hay baling assembly of claim 6, wherein said each one of said extendible side arms comprise a first proximate collapsible and extendible side arm pivotally connecting to a second distal collapsible and extendible side arm including hydraulic power unit means in fluid communication with said tractor for extending and retracting said first proximate collapsible and extendable side arms and said second distal collapsible and extendible side arms.

8. The hay baling assembly of claim 6, wherein each tined diverter raking wheel rotates in a plane inclined at a selected acute angle to the horizontal and is caused to rotate by frictional engagement with the ground.

9. The hay baling assembly of claim 6, wherein each one of said first and said second articulated swing arm comprises a first rigid arm section and a second rigid arm section connected by hinge means whereby each said articulated swing arm is capable of bending to conform to uneven ground during use as a rake.

10. The hay baling assembly of claim 9, wherein said hinge means connecting said first rigid arm section and said second rigid arm section comprises at least one hydraulic cylinder capable of folding said second rigid arm section against and parallel to said first rigid arm section for the purpose of transport and of unfolding of said second rigid arm section outwardly away from said first rigid arm section to an in-line and in use position.

11. The hay baling assembly of claim 6, including power unit means for raising and lowering said first and a second articulated swing arms and said tined sweep raking wheels to a transport level and lowering said tined sweep raking wheels to a floating raking level.

12. The hay baling assembly of claim 6 wherein said tined diverter raking wheel comprises a central hub and an annular circular rim circumscribing said central hub disposed in selected spaced relation with respect thereto, and a plurality of spokes anchored to said central hub having a first portion extending outwardly to said annular circular rim and means retaining said plurality of spokes in selected spaced relation with respect to one another circumferentially around said annular circular rim, and at least selected ones of said plurality of spokes having a second portion extending beyond said annular circular rim with said second portion being disposed at a selected angle to said first portion.

13. The hay baling assembly of claim 12, wherein said tined diverter raking wheel comprises a circular unit having a hub, an annular circular rim circumscribing said hub and disposed in selected spaced relation with respect thereto, a plurality of spokes anchored to said hub extending outwardly at a selected angle from said rim, means retaining said spokes in selected spaced relation with respect to one another circumferentially around said rim and at least selected ones of said spokes having a second portion extending beyond said rim.

14. The hay baling assembly of claim 12, wherein said basket type tined raking reel tined diverter raking wheel comprises a hub including a first portion including a plurality of spokes extending outwardly therefrom and main wined in circumferential spaced apart relation by an annular rim circumscribing and radially spaced from said hub and each of said plurality of spokes extending from said hub to said rim, said tined diverter raking wheel including a second portion angularly disposed with respect to said first portion and projecting from said rim with said second portion located in a plane disposed generally perpendicular to the axis of rotation defining a generally cylindrical or truncated conical open wall whose axis coincides with the axis of rotation with said spokes passing through a respective one of a plurality of circumferentially spaced apart holes disposed in said rim and held in spaced apart relation.

15. The hay baling assembly of claim 6, wherein said tined diverter raking wheel of said windrow crowder and diverter assembly detachably attaching to an end of a shaft journalled for rotation extending a link assembly comprising an upper link and a lower link pivotally attaching to said frame member, a link assembly hydraulic cylinder extending from a selected attachment position of said draw bar to said link assembly for raising and lowering said tined diverter raking wheel, and at least one tension spring extending from a selected attachment position of said draw bar connecting to said link assembly providing means for counterbalancing said tined diverter raking wheel and enabling said tined diverter raking wheel to float at a raking level with a selected tined arc portion engaging the ground causing rotation of same, and said tined diverter raking wheel assembly including a second hydraulic cylinder in fluid communication with the hydraulic power of the tractor including a first end mounting to an attachment position on said crossbar and a second end connecting to an attachment position on said link assembly providing lateral movement of said tined diverter raking wheel mounted thereon and controllably movable for shifting a marginal edge of a windrow of hay laterally to a selected position in alignment with said roll baler pickup.

16. The hay baling assembly of claim 15, wherein said link assembly including a diagonal link connecting said link assembly to said link assembly hydraulic cylinder.

17. A windrow diverter assembly comprising:
a frame member mounting on an elongated draw bar in front of a roll baler having a roll baler pick-up of greater width than a width of a windrow of hay, said diverter assembly including a pair of opposing tined diverter raking wheel units rotatably and swingably mounting onto said frame member each one of said tined diverter raking units including at least one hydraulic cylinder in fluid communication with a hydraulic power unit of a tractor connecting to each one of said tinted diverter raking units and controllably movable to move the windrow of hay laterally to a selected position with respect to said roll baler pick-up, diverting said windrow to selected different positions laterally across the width of said roll baler pick-up providing a windrow of hay moving from one lateral edge of said roll baler pickup to the opposing lateral edge of said roll baler pickup forming a uniform roll of hay having a width greater than said width of said windrow moving in and back independently diverting said windrow of hay to the side of the roll baler pickup as needed, wherein said tined diverter raking wheels are not fixed and are capable of adjustably moving a windrow from side to side during operation, shifting a marginal edge of a windrow of hay laterally to a selected position in alignment with respect to said roll baler pick-up and diverting said windrow to selected different positions aligned laterally across the width of said roll baler pick-up; and
said tined assembly comprising said tined diverter raking wheel detachably attaching to an end of a shaft journalled for rotation extending a link assembly comprising an upper link and a lower link pivotally attaching to said frame member, a link assembly hydraulic cylinder extending from a selected attachment position of said frame member to said link assembly for raising and lowering said tined diverter raking wheel, and at least one tension spring extending from a selected attachment position of said frame member connecting to said link assembly providing means for counterbalancing said tined diverter raking wheel and enabling said tined diverter raking wheel to float at a raking level with a selected tined arc portion engaging the ground causing rotation of same, and said tined diverter raking wheel assembly including a second hydraulic cylinder in fluid communication with the hydraulic power of the tractor including a first end mounting to an attachment position on said crossbar and a second end connecting to an attachment position on said link assembly providing lateral movement of said tined diverter raking wheel mounted thereon and controllably movable for shifting a marginal edge of a windrow of hay laterally to a selected position in alignment with said roll baler pick-up.

18. The windrow diverter assembly of claim 17 wherein said fined diverter raking wheel comprises a central hub having a plurality of longitudinal members anchored to said central hub and extending radially outward in selected spaced relation with respect to one another circumferentially around said central hub with said tines extending therefrom at a selected angle.

19. The windrow diverter assembly of claim 17, said link assembly including a diagonal link connecting said link assembly to said link assembly hydraulic cylinder.

20. The hay baling assembly of claim 17, wherein said hydraulic cylinder of said tined assembly raises said tined assembly to a transport level or lowers it to a floating raking level.

21. A roll baler and windrow diverter assembly, comprising:
a roll baler having a draw bar and a frame member positioned in front of a roll baler pick-up;
a windrow diverter apparatus including a pair of tined diverter raking wheel units, each one comprising a wheel or basket rotatably and swingably mounting onto a diverter assembly extending from said frame member defining a crossbar supported by said draw bar extending from said roll bale, said at least one pair of tined diverter raking wheel units positioned to rotate a tined diverted raking wheel in a plane inclined at a selected acute angle to the horizontal causing said tined diverter raking wheel to rotate by frictional engagement with the ground during the raking and baling operation;
said tined diverter raking wheel comprising a hub with a plurality of longitudinal members extending outwardly therefrom maintained in circumferential spaced apart relation circumscribing and radially spaced apart from the hub, said tines extending downward a selected length from said hub;
said tined diverter raking wheel detachably attaching to a rotatable plate on an end of a shaft journalled for rotation proximate the lower end of a first post extending from an upper and lower spaced apart pair of links pivotally attaching to a second post extending from said crossbar including diagonal link connecting said upper link and said lower link;
at least one tension spring extending downward from said second post toward said first post and said tined diverter raking unit providing counterbalancing means for allowing said tined diverter raking wheel to float at a raking level with a selected tined arc portion engaging the ground during raking;
at least one hydraulic cylinder in fluid communication with a hydraulic cylinder unit of a tractor with said a first end of said hydraulic cylinder connecting said second post and an opposing second end of said hydraulic cylinder connecting to said cross member providing lateral movement of said diverter assembly controllably movable to move the windrow of hay laterally to a selected position with respect to said roll baler pick-up diverting said windrow to selected different positions laterally across the width of said roll baler pick-up providing a windrow of hay for pickup by a selected portion of said baler pickup by moving from a first lateral edge of said roll baler pickup toward an opposing lateral edge of said roll baler pickup.

22. The roll baler and windrow diverter assembly of claim 21, wherein said windrow diverter assembly is in electrical communication with a control unit mounted on a tractor and means for detecting the size of a round bale on each lateral wall of a baling chamber of said roll baler by width or diameter of said round bale forming in said baling chamber, said control unit receiving an electrical signal from said means for detecting and sending an electronic signal to said windrow diverter assembly positioning at least one tint assembly to divert a windrow in front of said roll baler pickup moving said tint assembly from side to side during baling to align said windrow with said roll baler pickup forming a round bale of uniform diameter.

23. The roll baler and windrow diverter assembly of claim 21, said tined diverter raking wheel rotating in a plane inclined at a selected acute angle to the horizontal.

24. The roll baler and windrow diverter assembly of claim 21, further including:
a wheel rake including a pair of opposing extendible side arms defining a first side arm and a second side arm having a proximate end pivotally mounted to said elongated draw bar, said first side arm and said second side arm including a plurality of rake wheels, said wheel rake mounting in front of said windrow diverter assembly and behind said tractor, said wheel rake including hydraulic means for positioning said first side arm and said second side arm laterally in an open in-use position and retracting said first side aria and said second side arm in a closed retracted position parallel to said elongated draw bar.

* * * * *